United States Patent
Chen et al.

(10) Patent No.: US 10,289,596 B2
(45) Date of Patent: May 14, 2019

(54) MEMORY AND METHOD FOR OPERATING A MEMORY WITH INTERRUPTIBLE COMMAND SEQUENCE

(71) Applicant: MACRONIX INTERNATIONAL CO., LTD., Hsinchu (TW)

(72) Inventors: Ken-Hui Chen, Hsinchu (TW);
Kuen-Long Chang, Taipei (TW);
Su-Chueh Lo, Hsinchu (TW);
Chun-Yu Liao, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 104 days.

(21) Appl. No.: 15/411,731

(22) Filed: Jan. 20, 2017

(65) Prior Publication Data
US 2017/0351636 A1    Dec. 7, 2017

Related U.S. Application Data

(60) Provisional application No. 62/346,577, filed on Jun. 7, 2016.

(51) Int. Cl.
*G06F 13/42*          (2006.01)
*G06F 13/16*          (2006.01)

(52) U.S. Cl.
CPC ...... *G06F 13/4234* (2013.01); *G06F 13/1631* (2013.01); *G06F 13/1673* (2013.01); *G06F 13/4291* (2013.01)

(58) Field of Classification Search
None
See application file for complete search history.

(56) References Cited

U.S. PATENT DOCUMENTS

| | | | |
|---|---|---|---|
| 6,459,617 | B1 | 10/2002 | Roohparvar |
| 6,775,727 | B2 | 8/2004 | Moyer |

(Continued)

FOREIGN PATENT DOCUMENTS

| | | |
|---|---|---|
| EP | 2966573 A1 | 1/2016 |
| TW | I221968 | 10/2004 |

(Continued)

OTHER PUBLICATIONS

Intel Application Note AP-684, "Understanding the Flash Translation Layer (FTL) Specification," Dec. 1998, 20 pages.

(Continued)

*Primary Examiner* — Henry Tsai
*Assistant Examiner* — Christopher A Bartels
(74) *Attorney, Agent, or Firm* — Haynes Beffel & Wolfeld LLP

(57) ABSTRACT

A memory device includes command logic allowing for a command protocol allowing interruption of a first command sequence, such as a page write sequence, and then to proceed directly to receive and decode a second command sequence, such as a read sequence, without latency associated, completing the first command sequence. Also, the command logic is configured to be responsive to a third command sequence after the second command sequence and its associated embedded operation have been completed, which completes the interrupted first command sequence and enables execution of an embedded operation identified by the first command sequence. A memory controller supporting such protocols is described.

20 Claims, 22 Drawing Sheets

(56) References Cited

U.S. PATENT DOCUMENTS

| | | | |
|---|---|---|---|
| 8,224,884 B2* | 7/2012 | May | G06F 15/17381 370/389 |
| 2002/0133646 A1* | 9/2002 | Cheung | G06F 13/385 710/22 |
| 2008/0133779 A1* | 6/2008 | Ho | G06F 13/4291 710/5 |
| 2009/0103362 A1* | 4/2009 | Pekny | G06F 13/1694 365/185.04 |
| 2009/0137318 A1* | 5/2009 | Russo | G06F 13/4291 463/40 |
| 2011/0060875 A1* | 3/2011 | Haukness | G11C 16/10 711/103 |
| 2011/0153910 A1* | 6/2011 | MacKenna | G06F 13/4234 711/103 |
| 2012/0324147 A1 | 12/2012 | Lai | |
| 2013/0339681 A1* | 12/2013 | Prado | G06F 9/30123 712/225 |
| 2016/0350240 A1* | 12/2016 | Grafton | G06F 13/1668 |

FOREIGN PATENT DOCUMENTS

| | | |
|---|---|---|
| WO | 2007110716 A1 | 10/2007 |
| WO | 2010143209 A1 | 12/2010 |

OTHER PUBLICATIONS

Macronix—MX29GL256F Data Sheet, 3V (VI-O), 256Mb, v1.5; Oct. 30, 2013, 72 pages.

Macronix-MX25L6455EMI-10G-datasheet, Rev. 1A, Feb. 10, 2012, 82 pages.

* cited by examiner

FIG. 7 (WO ADDR)

MEMORY AND METHOD FOR OPERATING A MEMORY WITH INTERRUPTIBLE COMMAND SEQUENCE

PRIORITY APPLICATION

This application claims the benefit of U.S. Provisional Patent Application No. 62/346,577 filed 7 Jun. 2016. The application is incorporated herein by reference.

FIELD OF THE TECHNOLOGY

The present technology relates to memory devices having embedded logic responsive to command sequences, and particularly to interruptible command sequences.

DESCRIPTION OF RELATED ART

FIG. 1 illustrates components of a basic memory system as known in the prior art. In the illustrated memory system, a host 2 executes programs that read and write data using logical addresses. The host 2 communicates across a communication link 3 with a controller 4, which can be implemented in some examples using software or other logic structures in a microcontroller unit MCU or a dedicated memory controller chip. In some embodiments, the host and controller can be implemented on a single processor. In other embodiments, the host and controller can comprise parts of a complex data processing system. The controller 4 acts as an interface between the host and physical memory devices, such as memory 6. The controller 4 translates higher-level read and write requests into the command language of particular memory 6. For flash memory, the controller 4 may include an interface layer known as Memory Technology Device (MTD) in some systems. In this common configuration, the controller 4 is responsible for composing command sequences for read and write operations with the memory 6, in a manner compatible with the memory 6.

The controller 4 is connected to the memory 6 by a bus 5. For the purposes of this description, the term "bus" refers to a communication system that transfers data between bus nodes, including in the memory system example a controller 4 (e.g., memory controller, microcontroller, or other bus node controlling operation of the memory devices) and memory 6. The bus includes the bus lines (physical layer connections like wires, optical fiber, wireless links, etc.), and a bus interface including input/output circuits on the devices and logic on the devices that together implement a communication protocol compliant with the bus specifications.

In the configuration of FIG. 1, the controller 4 uses a bus structure having a plurality of bus lines I/O 0~N, along with a chip select line CSB (active low in this example) and a clock line CK. For instance, the bus 5 can comprise a serial peripheral interface SPI bus or other synchronous serial communication interface characterized by a synchronous clock line, a chip select line and one or more data lines synchronized with a synchronous clock on the synchronous clock line. SPI devices typically use a four-wire synchronous serial communication protocol, which can communicate in full duplex mode (CK, CSB, master in/slave out MISO, master out/slave in MOSI). A variant of SPI uses a single bidirectional data line (slave out/slave in, called SISO) instead of two unidirectional ones (MOSI and MISO). Another variant multi I/O SPI uses multiple parallel data lines (e.g., IO0 to IOn) to increase throughput. These serial bus architectures combine the advantage of speed with reduced pin count as compared to parallel bus architectures.

Others bus standards include I²C, which comprises a four-wire synchronous serial communication protocol, but employs differential signaling and provides only a single simplex communication channel.

In some high-speed memory systems, such as might be used for so-called execution-in-place XIP system applications, it is desirable to be able to read data very frequently and very quickly to support mission functions of the host system. In some memory types, such as flash memory, a write can include program operations and erase operations which can take a significant amount of time. So if the host desires to read data during execution of a program or erase operation, it is often required to wait for completion of those operations. Some memory systems implement erase and program suspend operations, allowing the controller to issue a suspend command after a program or erase operation has begun executing. In response to a suspend command, the memory device performs an operation to back out of the program or erase operation, and when that is completed, enables the system to accept a read command sequence. However, the latency involved in a critical read can be a serious limitation on system performance.

Also, particularly in serial protocols, the write command sequence can be quite long. For example, a page write command sequence can require hundreds of bytes of data transfer on the bus, including a command code, address codes and a full page of data. Also, the command sequence itself is not interruptible. This creates a condition illustrated in FIG. 2, in which a host may desire to read data quickly, but must wait hundreds of clock cycles until completion of the write command sequence before issuing a suspend command, and then wait for the suspend operation to complete, before proceeding with the read.

FIG. 2 is a timing diagram showing a chip select signal CSB (active low), a clock signal CK and data signals DATA, such as might be implemented using an SPI compliant bus. Proceeding from left to write in the top row, a transition of the CSB line from high-to-low signals the beginning of a command sequence. The controller 4 then issues a write operation code WR, in this example followed by a plurality of address bytes A1, A2, A3, and then followed by the data bytes D1 to Dn. At the end of the write command sequence, a transition 21 of the CSB line from low-to-high signals the end of the command sequence, and enables the memory to proceed with the write operation using embedded logic. In some prior art implementations, the transition 21 CSB line must occur within a specified time interval of the last data in the command sequence, else the operation is aborted. Assuming, for example, that the host desires to read data at time 20, or at any other time before completion of the write command sequence, the write command sequence must first be completed, followed by a CSB line transition from low-to-high. This causes the memory device to begin the embedded write operations. The controller then causes the CSB line to transition from high-to-low indicating the beginning of another command sequence. The controller issues a suspend command 23 and the memory executes a suspend operation. After waiting a specified length of time or until a ready signal is provided by the memory, the controller 7 can cause the CSB line to transition from low-to-high at time 22. At this point, the memory is ready to accept a new command sequence as illustrated in the lower row of FIG. 2. The new command sequence is the critical read in this example, where transition of the CSB line from high-to-low indicates the beginning of another command sequence. The controller issues a command sequence including a read operation code RD, followed by address bytes A1, A2, A3, and the memory returns data bytes D1 to Dn. Thus, as seen in FIG. 2, the controller waits a significant amount of time after receiving a request from its host, before it is able to access the memory device for the requested data.

FIGS. 3 and 4 illustrate a logic flow in the controller used to generate the command sequences of FIG. 2. Beginning with FIG. 3, the process begins when a host requests a write (100). It then issues a write command including a command code, address bytes and data for loading into the memory (101). The logic in the controller waits for the data loading to finish (102). If the data loading is not finished at step 102, then another byte is loaded (103) and the sequence continues until the data loading is finished. When the data loading has finished, the memory device enters an embedded program flow and the controller waits for completion (104).

FIG. 4 shows the operation if a read request is received after the embedded program flow of block 104 has begun. FIG. 4 starts with the beginning of the program flow (106). Logic in the host monitors for a read request (107). If there is no read request, then the logic waits for the embedded program to finish (108). If the embedded program is not finished, then the controller continues to look for a read request. After the embedded program is finished at block 108, then the controller enters a standby state (109). If at block 107, a read request is received, then the controller issues a suspend command (110). The controller then waits for a suspend ready signal by the memory (111). After receiving the suspend ready at block 111, the read command sequence is issued and the controller waits for the read to finish (112). Once the read is finished, the controller issues a resume command (113). Resume command is complementary of the suspend command, and enables the memory device to proceed with the suspended program flow.

Thus, it can be seen that substantial latency is introduced when a read operation is requested during a write command sequence and during the embedded program flow executed by the memory device in response to the write command sequence. This latency can interfere with mission-critical read operations in high-speed memory systems.

There are some memory devices that can execute a so-called read-while-write RWW operation. These systems can allow a read command to be issued while an embedded write operation is underway. In this case, the controller may not need to issue a suspend command as discussed with reference to FIGS. 2-4. However, is necessary that the write command sequence finish before the read command can be issued. Also, there may be restrictions on data that can be accessed for read-while-write operations, to avoid interference between the separate operations being executed on the memory device. For example, the memory device might require a multiple bank architecture so that read operations can be executed on a different bank than that being used for the parallel program operation. Even in read-while-write systems, the latency involved in waiting for completion of the write command sequence can introduce significant delay overhead in high speed memory systems.

An alternative approach to addressing the problem with read latency includes introducing a DRAM 9 or other high-speed memory as illustrated FIG. 5. In the memory system of FIG. 5, the controller 7 is coupled to a flash memory 8 and to a DRAM 9 which shares the same data lines of the bus that is coupled to the flash memory 8. The DRAM 9 can be operated as a cache system in a variety of configurations to reduce latency in some situations. However, the additional hardware and space requirements, as well as additional logic processing required, can increase the expense of this type of system.

Therefore, it is desirable to provide a system which can reduce the read latency in high-speed memory systems.

SUMMARY

A memory device is described that includes command logic allowing for interruption of a first command sequence, such as a page write sequence, before the command sequence has been completed, and then to proceed directly to receive and decode a second command sequence which can have a higher priority for completion at a controller level or host level, without the latency associated with completing the first command sequence. Also, the command logic is configured to be responsive to a third command sequence, after the second command sequence is completed, and in some types of commands after the embedded operation associated with the second command sequence have been completed, which completes the interrupted first command sequence and enables execution of an embedded operation such as the page write, identified by the first command sequence. Such higher priority command sequences can be specified for a particular system, and can include a sequence or sequences specified for higher priority at the host or controller levels such as read sequences, Write Register sequences, Write Status sequences, Set protect configuration sequences, Read ID sequences, Read status sequences, and Erase special Registers sequences and the like. To avoid complication of the description, the examples described below are based on a read sequence.

A memory device is described comprising a memory, such as a nonvolatile memory like NOR flash. The memory device has a bus interface, such as a synchronous serial port. In one embodiment that includes a synchronous serial port, the bus interface is compliant with an SPI protocol. The memory device includes control circuitry to access the memory and execute memory read and write operations. For flash memory, for example, such control circuitry can include logic and bias circuits which automatically execute program and erase operations based on instructions received from command logic. The memory device also includes command logic which supports interruptible command sequences. Thus, the command logic in this example is configured to decode command sequences received on the bus interface. The command sequences can comprise operation codes, and one or both of addresses and data received or transmitted on the bus interface. The command logic is also configured to enable the control circuitry to execute operations identified by the command sequences. As set out herein, while receiving a first command sequence, the command logic is responsive to a first control signal (e.g., a first transition of a chip select signal) to interrupt the first command sequence. Because the first command sequence is interrupted, embedded operations associated with the operation identified in the first command sequence are not completely defined before the interruption and in some cases will not have been started. The command logic is responsive to a second control signal (e.g. a second transition of the chip select signal) after the first control signal to receive and decode a second command sequence and to enable the control circuitry to execute an operation identified in the second command sequence. The first and second control signals can be for example, the leading and trailing edges respectively of a single pulse on a chip select line. The command logic is responsive to a third control signal after the bus interface becomes available at a point after completion of the second command sequence, to receive and decode a third command sequence. The third command sequence can include an operation code, and one or both of addresses and data, to resume the interrupted first command sequence, and to enable the control circuitry to execute the operation identified by the first command sequence.

In embodiments described herein, the command logic in the memory device includes a buffer to hold at least portions of the first command sequence during the decoding and execution of the second command sequence. Also, the command logic can decode the third command sequence using the portions of the first command sequence stored in the buffer.

A configuration is described herein in which the operation code of the first command sequence identifies a write operation for which data is received on the bus interface on a particular bus line, and the operation code of the second command sequence identifies a read operation for which the operation code is received in the bus interface on the same particular bus line.

A configuration is described herein in which the operation code of the first command sequence identifies a write operation, and the third command sequence includes the operation code and the address of the first command sequence. In order to enable the embedded operation associated with the write operation, an event confirming completion of the write sequence other than or in addition to the first control signal can be required. In examples described herein, a write confirm event can include a count of the amount of data received in the command sequence, or an indication of the command sequence reaching an address boundary.

A configuration is described herein in which the operation code of the first command sequence identifies a write operation, and the third command sequence includes a write continue operation code, distinct from the write operation code, without an address.

A configuration is described herein in which the operation code of the first command sequence identifies a write operation, and the first command sequence identifies a write count. Logic in the command logic determines whether all the data in the command sequence indicated by the write count is received upon receipt of the first control signal. If it has not been received, then the command logic can enter a mode waiting for the second control signal. If all the data indicated by the write count has been received, then the embedded write operation can be enabled upon receipt of the first control signal or other control signal at the end of the third command sequence.

A configuration is described herein in which the operation code of the first command sequence identifies a write operation, the command logic is configured to receive and decode a write confirm operation code after a control signal following the third command sequence, and to enable the embedded operation identified by the first command sequence in response to the write confirm operation code.

In embodiments described herein, a write command sequence can be interrupted a plurality of times.

In another aspect of the technology described herein, a method of operating a memory is provided including interruptible command sequences.

In another aspect of the technology described herein, a command protocol and a memory controller implementing the command protocol are described, which supports interruptible command sequences.

Other aspects of the technology presented here are set forth in the drawings, the detailed description and the claims which follow.

DETAILED DESCRIPTION

A detailed description of embodiments of the present technology is provided with reference to FIGS. 1-20. FIGS. 1-5 have been described above as background information.

Figure 1:
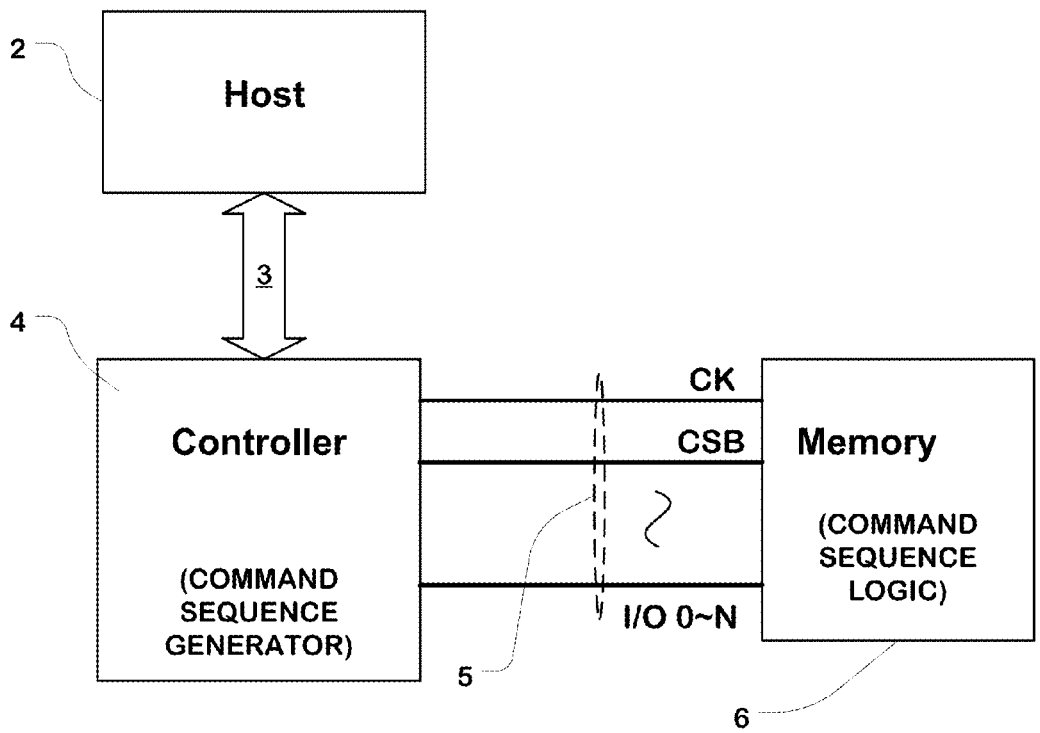
FIG. 1 is a simplified diagram of a memory system known in the prior art.
Figure 5:
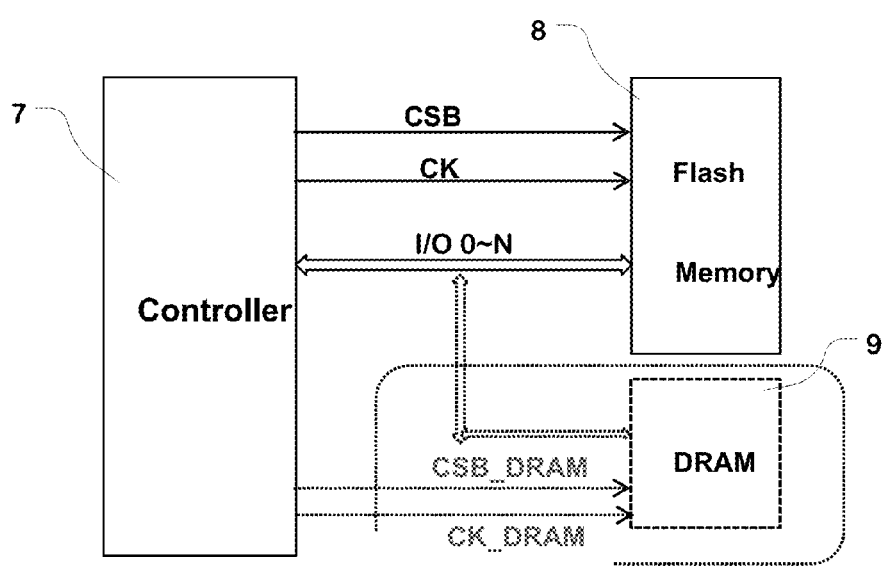
FIG. 5 is a simplified diagram of a memory system including a DRAM cache, according to the prior art.
Figure 2:
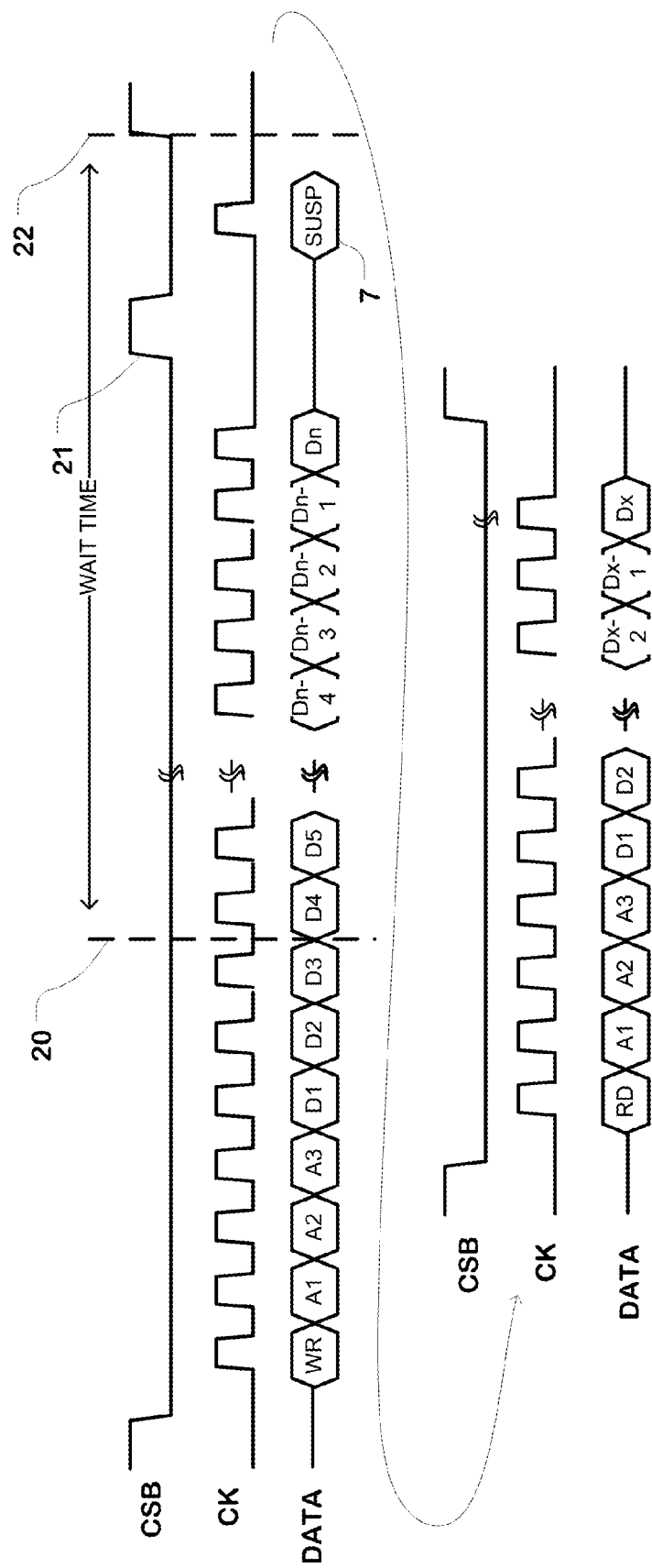
FIG. 2 is a timing diagram of a write command sequence, a suspend command, and a read command sequence according to the prior art.
Figure 3:
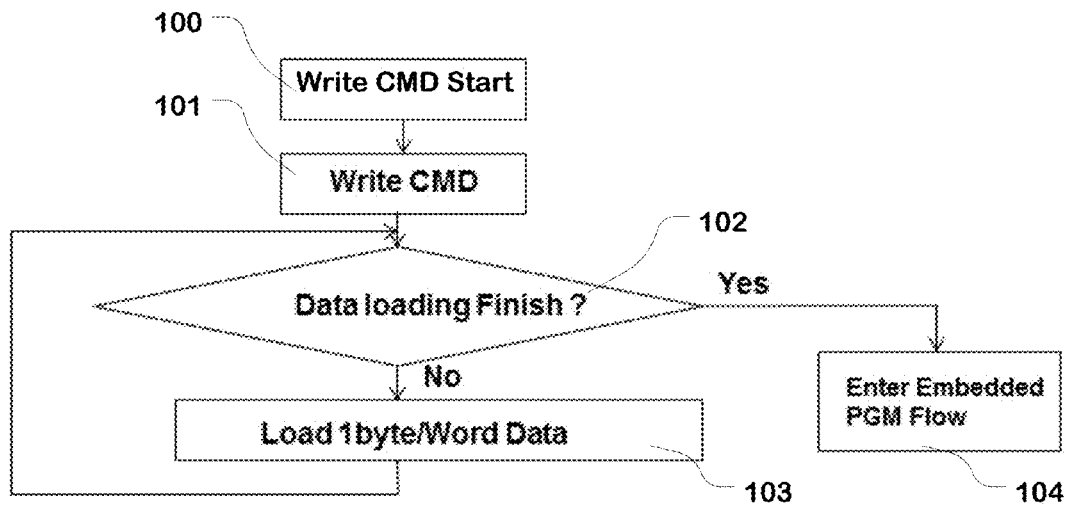
FIG. 3 and FIG. 4 are flow diagrams illustrating controller operations for generating command sequences as shown in FIG. 2.
Figure 4:
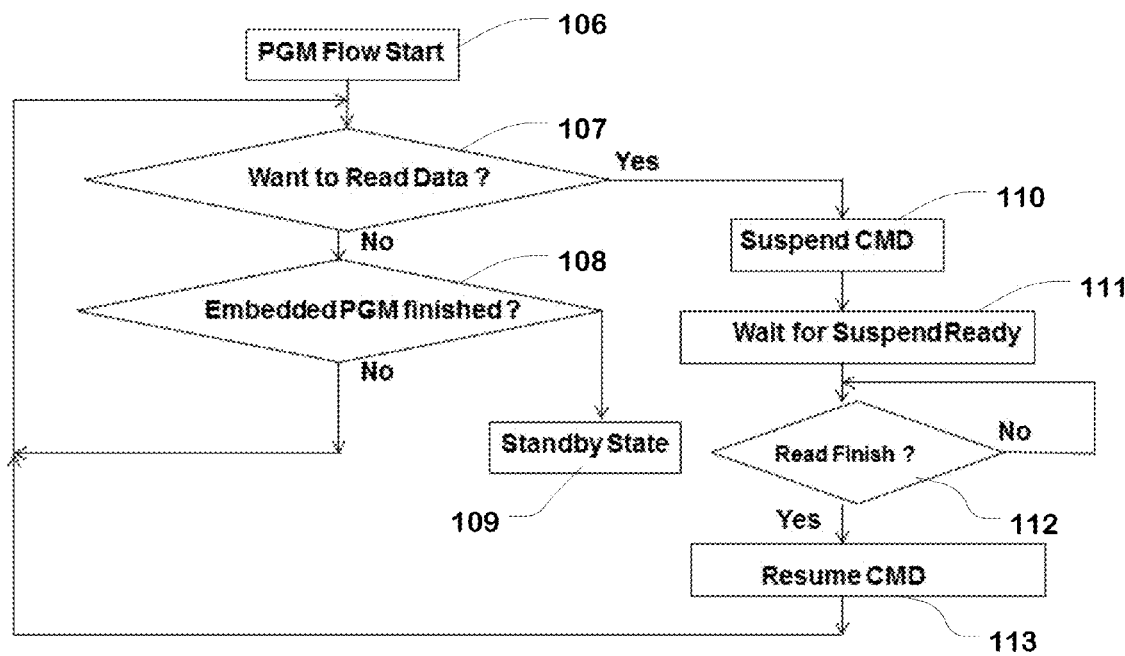
Figure 6:
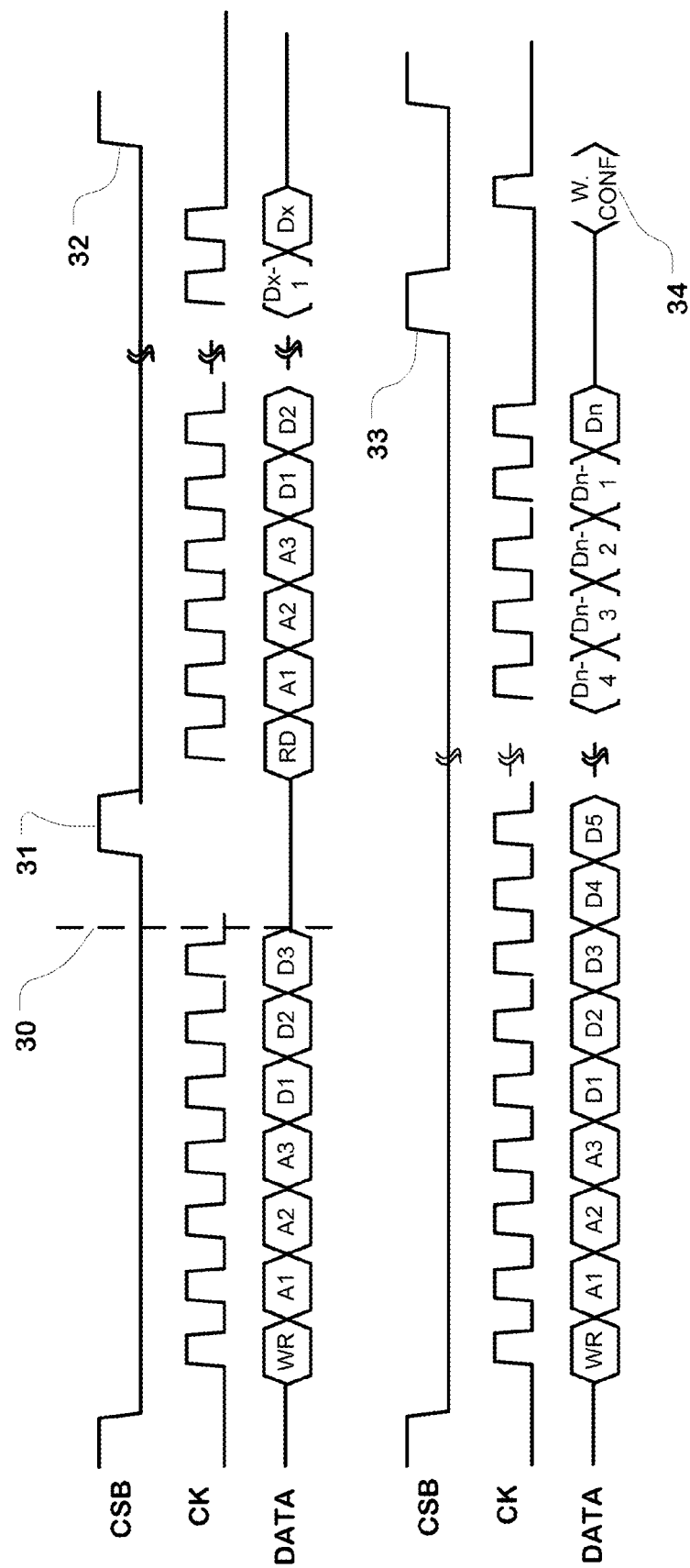
FIG. 6 is a timing diagram showing an interruptible write command sequence including operation code, address and data, with a write confirm command.

FIG. 6 is a timing diagram of an interruptible write command sequence according to a first embodiment.

For the purposes of the present application, a command sequence comprises a byte or a sequence of bytes and optional control signals. A command sequence including a sequence of bytes can include a first byte or set of bytes, which comprises an operation code. A second byte, or a set of bytes, can comprise an address for the operation identified by the operation code. In a write command sequence, bytes following the address can comprise data to be written upon execution of the write operation. In a read command sequence, the command sequence can terminate with the address bytes. Some types of command sequences may include only an operation code that can be one or more bytes. Some types of write command sequences may not require addresses.

A byte is a basic storage unit used in many integrated circuit logic and memory circuits, and consists of eight bits. A basic storage unit can have other sizes, including for example one bit, two bits, four bits, 16 bits and so on. Thus, the description of a command sequence set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four-bit storage units combined with eight-bit storage units.

FIG. 6 is a timing diagram for a chip select bus line CSB (active low this example), a clock bus line CK, and the data bus line or lines DATA such as can be utilized in a synchronous serial port like SPI.

A first command sequence is initiated by the transition of the CSB line from high-to-low and by the beginning of the clock cycles on the CK line. The first byte of the first command sequence (eight bits received during the initial clock pulse) comprises an operation code WR for an interruptible write sequence. In some examples, the operation code WR may identify a page write operation. In the illustrated example, the next three bytes comprise a starting address for the write operation. After the address, data for the write operation is provided. After the third data byte D3 at time 30, the controller interrupts the first command sequence. In this example, the command sequence is interrupted by a first control signal 31 which is toggling the CSB line from low-to-high without a corresponding indication of the end of the write sequence. Upon interruption of the first command sequence, the controller again toggles the CSB line from high-to-low and provides a second command sequence. The first byte of the second command sequence in this example is an operation code for a read RD. The three bytes following the first byte comprise a starting address for the read. After receipt of the starting address, command logic on the memory enables the embedded read operation, and in the clock cycles following the address, output data is provided from the memory to the controller. Upon completion of the read operation, the controller toggles the CSB line from low-to-high at time 32. At a later time, the controller causes the CSB line to transition from high-to-low to initiate a third command sequence. The third command sequence comprises a resumption of the interrupted write command sequence. In this example, the first byte of the third command sequence is the operation code WR (the same operation code as used in the first command sequence) for an interruptible write sequence. The next three bytes comprise the address, and the following bytes comprise the data to be written. After the last data byte is provided, the controller toggles the CSB line from low-to-high at time 33. The embedded write operation is not initiated at this stage in this example. Rather, the controller toggles the CSB line from high-to-low, and then provides a single byte command sequence including a write confirm operation code W.CONF 34. Upon receipt of a write confirm operation code 34, the command logic enables control circuitry on the memory to execute the write operation using embedded logic. In this, and in other command sequences described herein, the controller may insert "dummy" cycles in some embodiments.

An interruptible write command sequence of this nature can be interrupted an unlimited number of times, and resumed by repeating the interruptible write sequence until it is successful.

Figure 7:
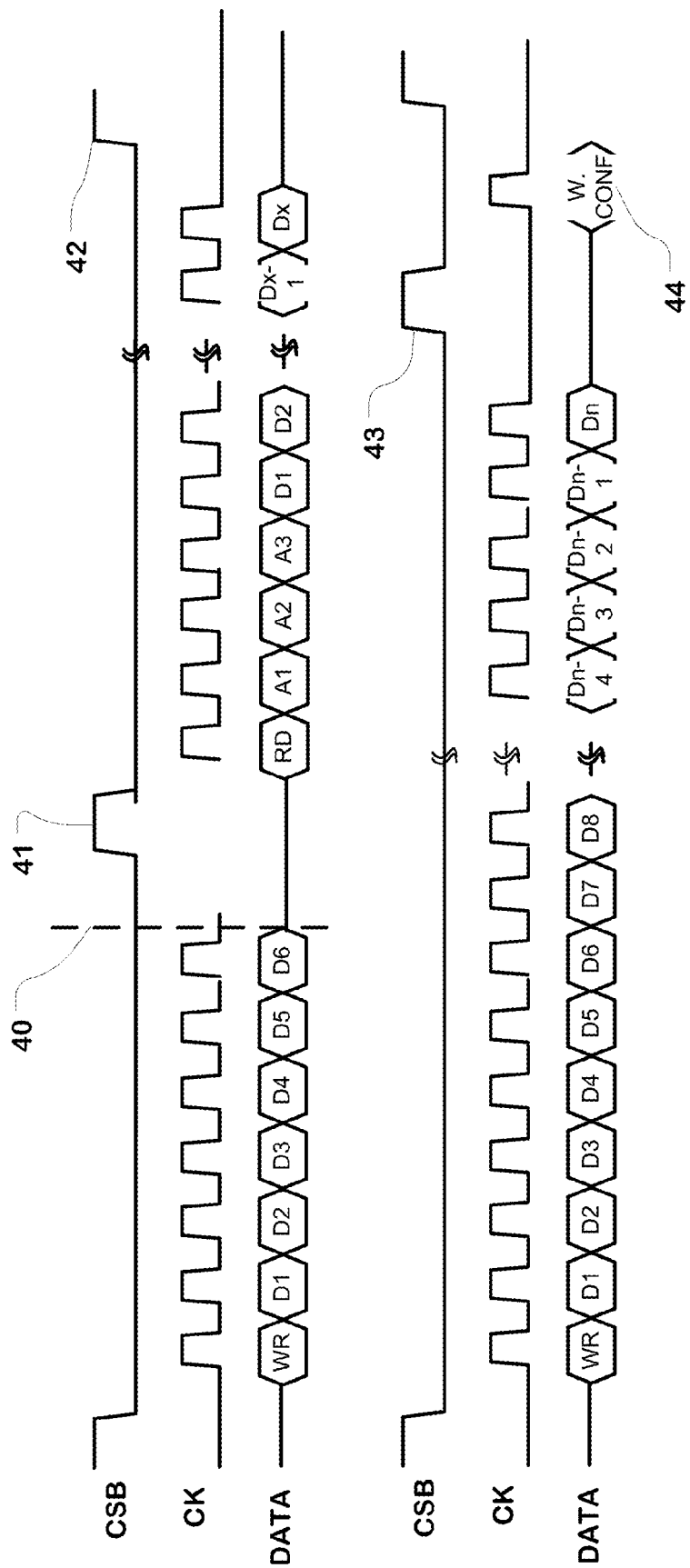
FIG. 7 is a timing diagram showing an alternative interruptible write command sequence without address signals, with a write confirm command.

FIG. 7 is an alternative command sequence like that of FIG. 6, except omitting the address bytes from the interruptible write command sequence.

In the example of FIG. 7, the first command sequence is initiated by the transition of the CSB line from high-to-low and by the beginning of the clock cycles on the CK line. The first byte of the first command sequence comprises an operation code WR for an interruptible write sequence without address bytes. In the illustrated example, the following bytes comprise data for the write operation. Address information for the write is provided by logic other than the command sequence, such as by address counters or status registers on the memory device which could be loaded with address information by other logical processes.

The controller decides to interrupt the first command sequence at time 40. To interrupt the sequence, the CSB line is toggled from low-to-high at time 41, without a corresponding indication of the end of the first command sequence. Then, the CSB line is toggled from high-to-low to indicate the beginning of a second command sequence. The first byte of the second command sequence in this example is an operation code for a read RD. The three bytes following the first byte comprise a starting address for the read. After receipt of the starting address, command logic on the memory enables the embedded read operation, and in the clock cycles following the address, output data is provided from the memory to the controller. Upon completion of the read operation, the controller toggles the CSB line from low-to-high at time 42. At a later time, the controller causes the CSB line to transition from high-to-low to initiate a third command sequence. The third command sequence comprises a resumption of the interrupted write command sequence. This example, the first byte of the third command sequence is the operation code WR (the same operation code as used in the first command sequence) for an interruptible write sequence. The following bytes comprise data to be written, with the address information provided by other sources as discussed above. After the last data byte is provided, the controller toggles the CSB line from low-to-high at time 43. The embedded write operation is not initiated at this stage in this example. Rather, the controller toggles the CSB line from high-to-low and then provides a single byte command sequence including a write confirm operation code 44. Upon receipt of a write confirm operation code, the command logic enables control circuitry on the memory to execute the page write operation using embedded logic.

Figure 8:
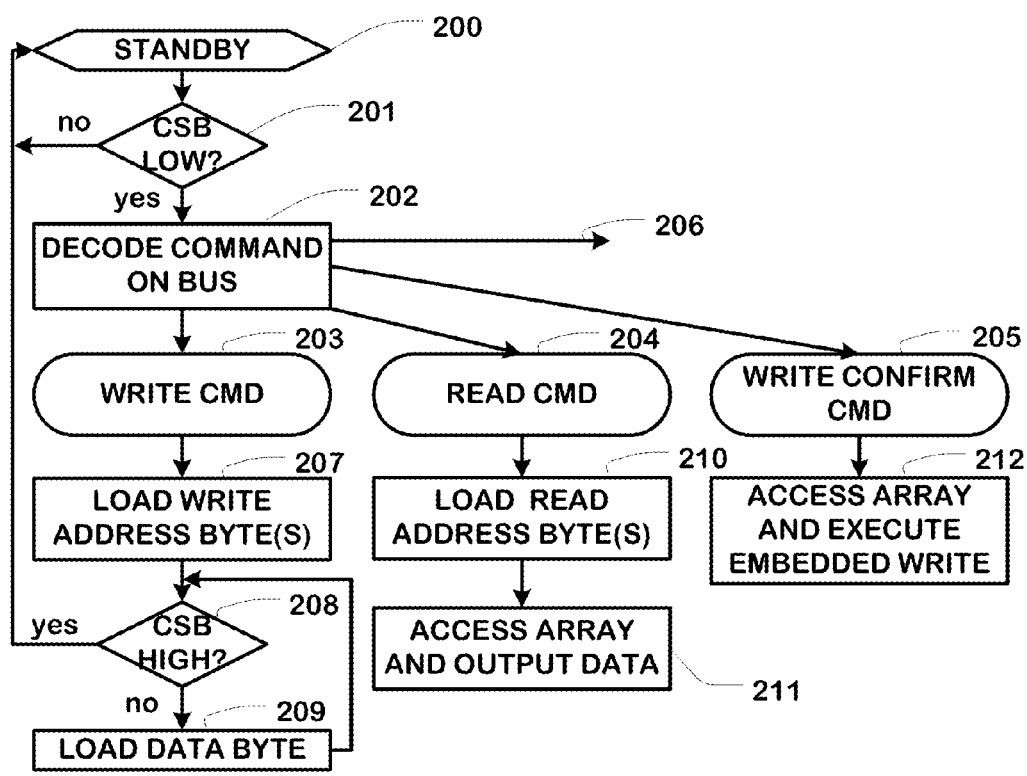
FIG. 8 is a logic diagram of command logic on a memory device for responding to an interruptible write command sequence as shown in FIGS. 6 and 7.

FIG. 8 is a flow diagram for command logic on a memory device receiving the first, second and third command sequences described with reference to FIG. 6 or FIG. 7. In this example, the flow diagram begins with the command logic in a standby mode 200. In standby, the command logic monitors the CSB line to detect a transition from high-to-low (201). When the transition occurs, the command logic decodes an operation code identifying a command received on the bus (202). A variety of operation codes can be decoded including a write command 203, a read command 204, the write confirm command 205, and other commands indicated by the arrow 206.

If the command logic decodes a write command, then it proceeds to load the address bytes from the command sequence, or read the address bytes from another source (207). After receiving the address bytes, the command logic monitors the CSB line to detect a transition from low-to-high (208). If a transition is not detected, then the command logic loads a data byte from the command sequence (209). After step 209, logic returns the block 208 to determine whether the CSB line transitions from low-to-high. This loop continues until all the data bytes are received, or until a CSB line transition is detected. If the transition is detected at block 208, then the logic returns to the standby mode 200, and monitors the CSB line for a transition from high-to-low.

If the command is a read command 204, then the command logic loads or reads the address bytes associated with the read (210), and enables the embedded circuitry to access the array and output the data of the read (211). Upon completion of the read operation, the memory can issue a ready signal, or the controller can detect the end and return to the standby mode 200.

If the command is a write confirm command (205), then the command logic can verify that it has properly loaded a command sequence for a write, and enables the control circuitry on the memory to access the array and execute the embedded write operation (212). After enabling the embedded write operation, the controller can return to the standby mode 200. Control circuitry can be "enabled" for the purposes of this description by simply setting a control signal, or control signals used by the embedded circuitry, to indicate a request to complete the operation, or by other more complex signaling.

Figure 9:
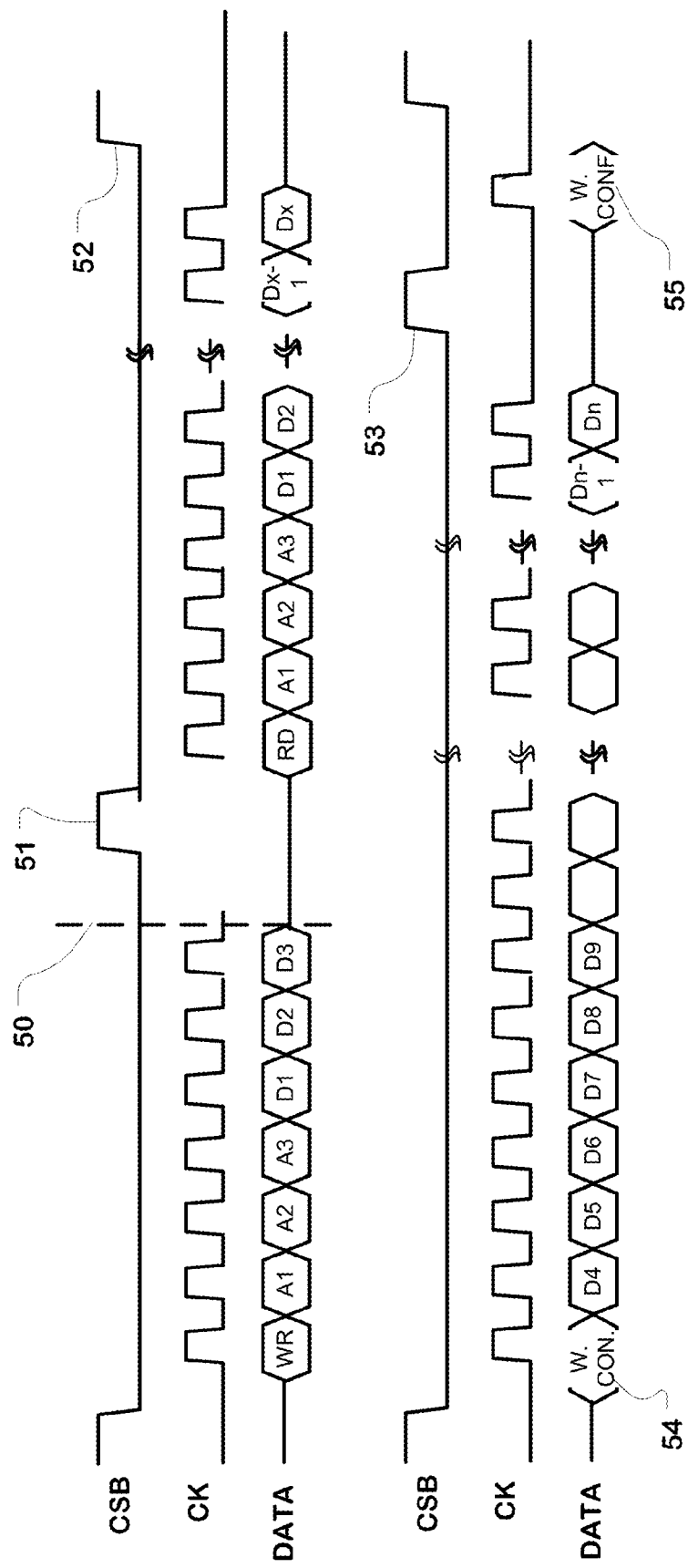
FIG. 9 is a timing diagram showing an interruptible write command sequence with a write confirm command, and in which a write continue command sequence is truncated by parts of the first write command sequence received before the interruption.

FIG. 9 is an alternative interruptible write command sequence in which a write continue operation code is utilized.

In the example of FIG. 9, the first command sequence is initiated by the transition of the CSB line from high-to-low and by the beginning of the clock cycles on the CK line. The first byte of the first command sequence (eight bits received during the initial clock pulse) comprises an operation code WR for an interruptible write sequence. In some examples, the operation code WR may identify a page write operation. In the illustrated example, the next three bytes comprise a starting address for the write operation. After the address, data for the write operation is provided. After the third data byte D3 at time 50, the controller interrupts the first command sequence. In this example, the command sequence is interrupted by a first control signal 51 which is the toggling the CSB line from low-to-high without a corresponding indication of the end of the write sequence. Upon interruption of the first command sequence, the controller again toggles the CSB line from high-to-low (a second control signal) and provides a second command sequence. The first byte of the second command sequence in this example is an operation code for a read RD. The three bytes following the first byte comprise a starting address for the read. After receipt of the starting address, command logic on the memory enables the embedded read operation, and in the clock cycles following the address, output data is provided from the memory to the controller. Upon completion of the read operation, the controller toggles the CSB line from low-to-high at time 52.

At a later time, the controller causes the CSB line to transition from high-to-low to initiate a third command sequence. The third command sequence comprises a resumption of the interrupted write command sequence. In this example, the first byte 54 of the third command sequence is the write continue operation code W.CON. for resumption of the interruptible write sequence. Also in this example, the command logic on the memory device stores the bytes received in the first command sequence for use upon resumption of the command sequence. Thus, the bytes in the third command sequence that follow the operation code comprise the data to be written. In this example, the first command sequence was interrupted after the third data byte D3, and the first byte following the operation code in the third command sequence is the fourth data byte D4 for the interruptible write sequence.

After the last data byte is provided, the controller toggles the CSB line from low-to-high at time 53. The embedded write operation is not initiated at this stage in this example. Rather, the controller toggles the CSB line from high-to-low, and then provides a single byte 55 command sequence including a write confirm operation code W.CONF. Upon receipt of a write confirm operation code W.CONF., the command logic enables control circuitry on the memory to execute the page write operation using embedded logic.

Figure 9A:
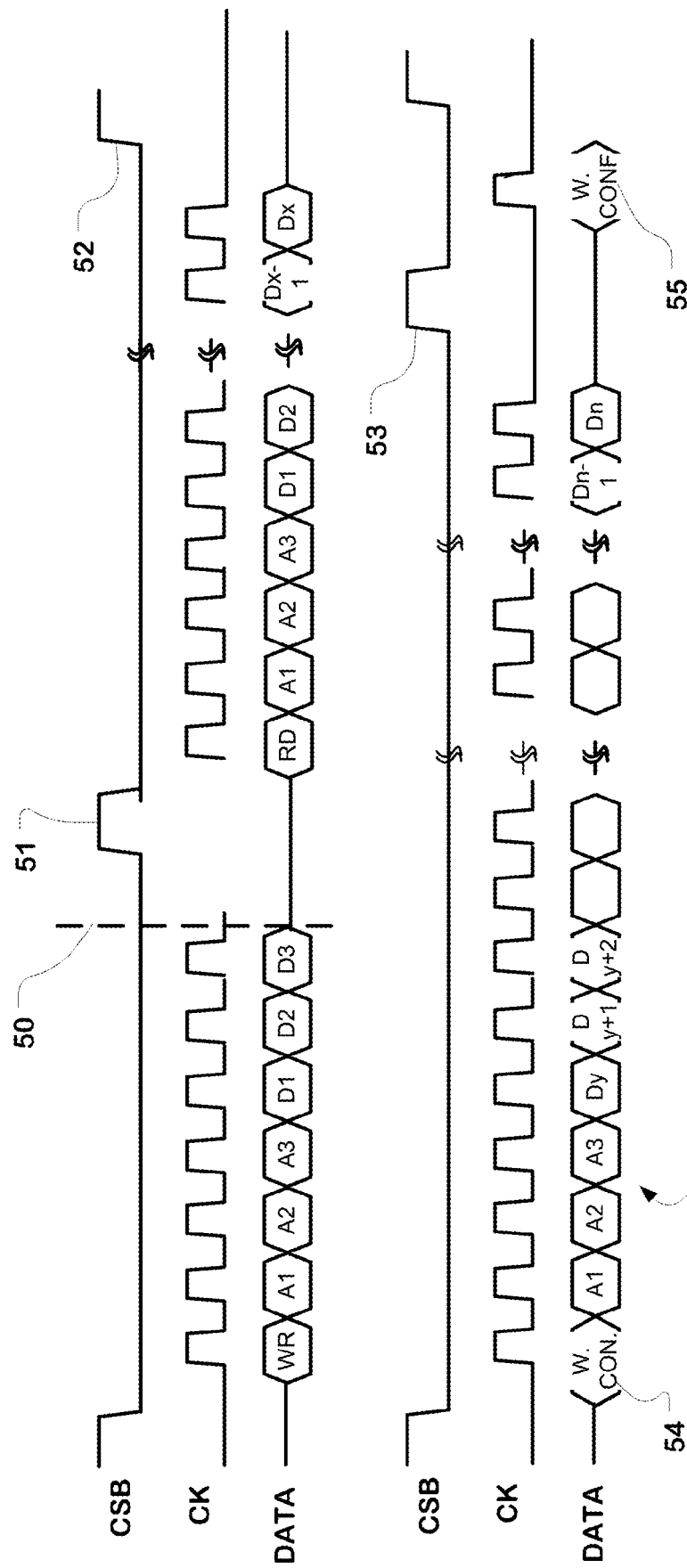
FIG. 9A is a timing diagram showing an interruptible write command sequence with a write confirm command, and a write continue command sequence.

FIG. 9A is an alternative interruptible write command sequence like FIG. 9, in which after the write continue operation code W.CON. in the third command sequence, a write address is provided, which can be the all or a portion of the write address from the interrupted write command sequence is repeated in the byte sequence 54A. The data bytes Dy, Dy+1, . . . can be the byte for the address in cycle 54A, and the next byte in the sequence. If the page address of the write continue operation code is different from that of the interrupted write command sequence, then a different data set can be provided at this point in the sequence, or this event can define the write sequence being aborted due to the change in page address.

Figure 10:
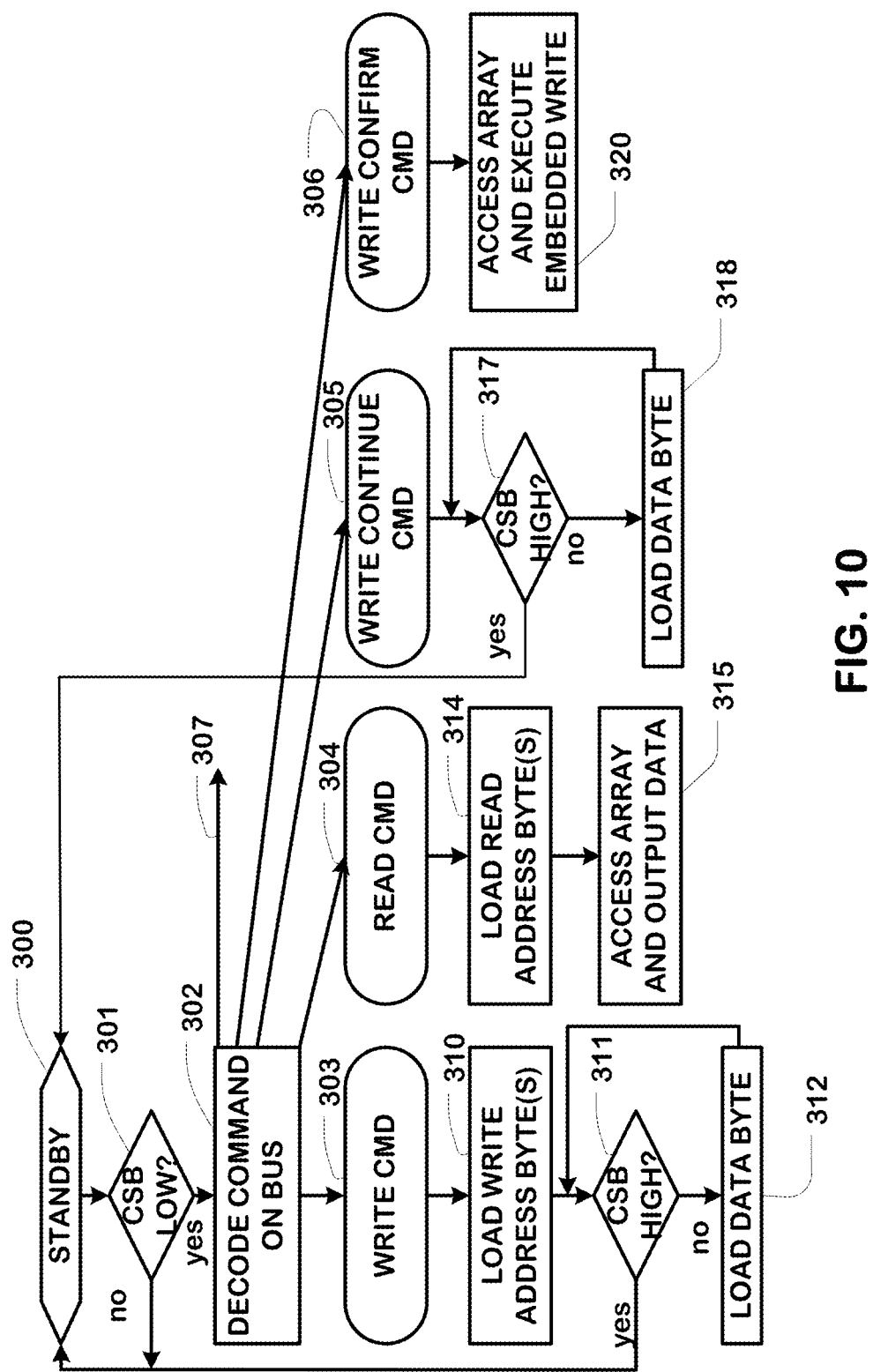
FIG. 10 is a logic diagram of command logic on a memory device for responding to an interruptible write command sequence as shown in FIG. 9.

FIG. 10 is a flow diagram for command logic on a memory device receiving the first, second and third command sequences described with reference to FIG. 9. In this example, the flow diagram begins with the command logic in a standby mode 300. In standby, the command logic monitors the CSB line to detect a transition from high-to-low (301). When the transition occurs, the command logic decodes an operation code identifying a command received on the bus (302). A variety of operation codes can be decoded including a write command 303, a read command 304, a write continue command 305, a write confirm command 306, and other commands indicated by the arrow 307.

If the command logic decodes a write command, then it proceeds to load the address bytes from the command sequence (310). After receiving the address bytes, the command logic monitors the CSB line to detect a transition from low-to-high (311). If a transition is not detected, then the command logic loads a data byte from the command sequence (312). After step 312, logic returns the block 311 to determine whether the CSB line transitions from low-to-high. This loop continues until all the data bytes are received, or until a transition is detected. If the transition is detected at block 311, then the logic returns to the standby mode 300 while storing portions of the command sequence received before the interruption. In the standby mode 300, the command logic monitors the CSB line for a transition from high-to-low. If the command is a read command 304, then the command logic loads or reads the address bytes associated with the read (314), and enables the embedded circuitry to access the array and output the data of the read (315). Upon completion of the read operation, the memory can issue a ready signal, or the controller can detect the end and return to the standby mode 300.

If the command is a write continue command (305), then the command logic monitors the CSB line to detect a transition from low-to-high (317), and if no transition is detected loads a data byte from the command sequence (318). After loading a data byte at block 318, the command logic returns to block 317 to continue monitoring the CSB line. If a transition is detected from low-to-high at block 317, then the command logic returns to the standby mode 300, while storing portions of the command sequence received before the interruption in a buffer.

If the command is a write confirm command (306), then the command logic verifies that it has properly loaded a command sequence for a write, and enables the control circuitry on the memory to access the array and execute the embedded write operation (320). After enabling the embedded write operation, the controller can return to the standby mode 300.

Figure 10A:
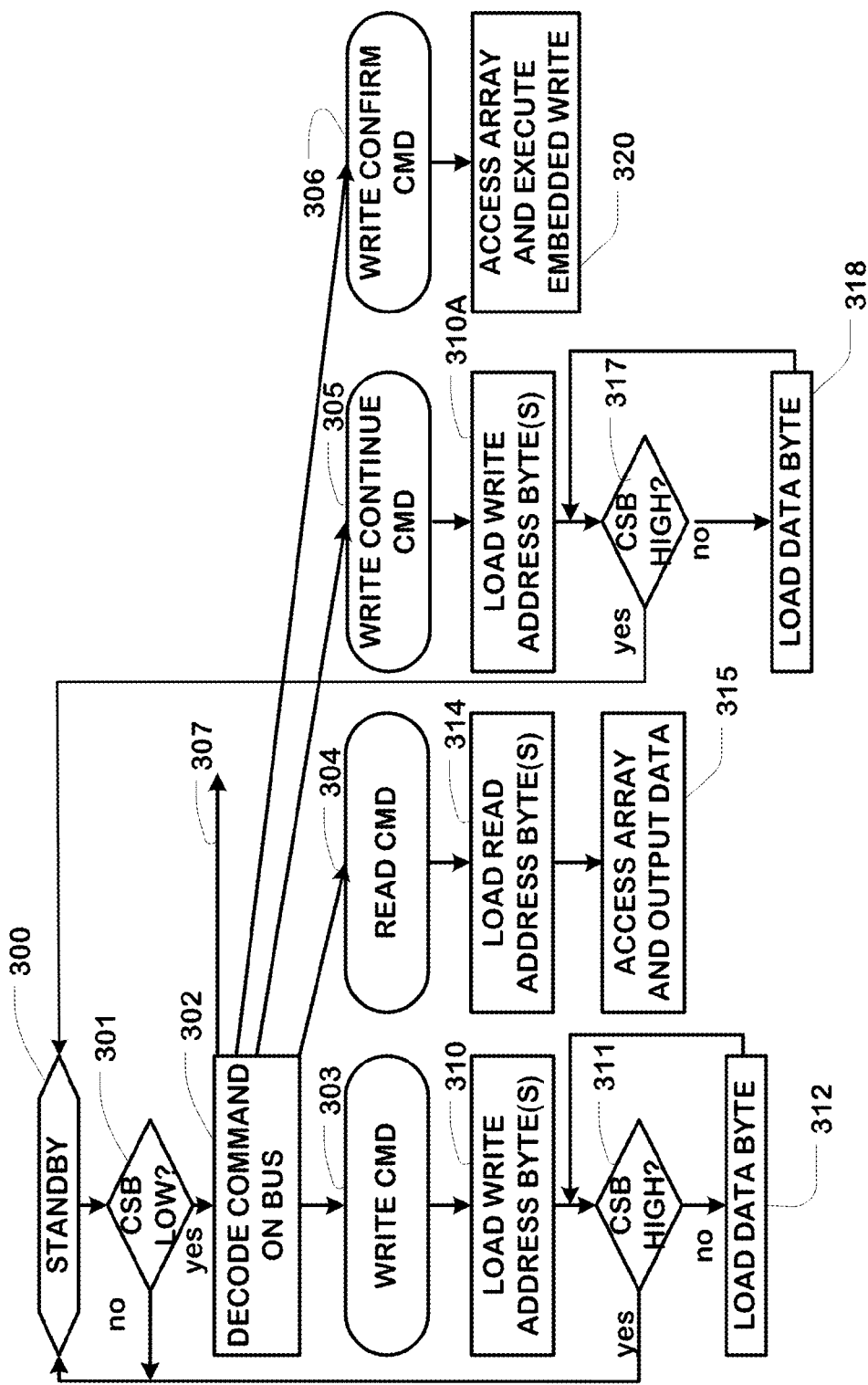
FIG. 10A is a logic diagram of command logic on a memory device for responding to an interruptible write command sequence as shown in FIG. 9A.

FIG. 10A is a flow diagram for command logic on a memory device like that of FIG. 10, except modified for the data sequence shown in FIG. 9A. going to the modification, if the command is a write continue command (305), then the command logic loads write address bytes from the command sequence (310A). Then the command logic sequentially loads the data bytes while it waits for a toggle of the chip select signal (317-318). Otherwise, FIG. 10A is like FIG. 10.

Figure 11:
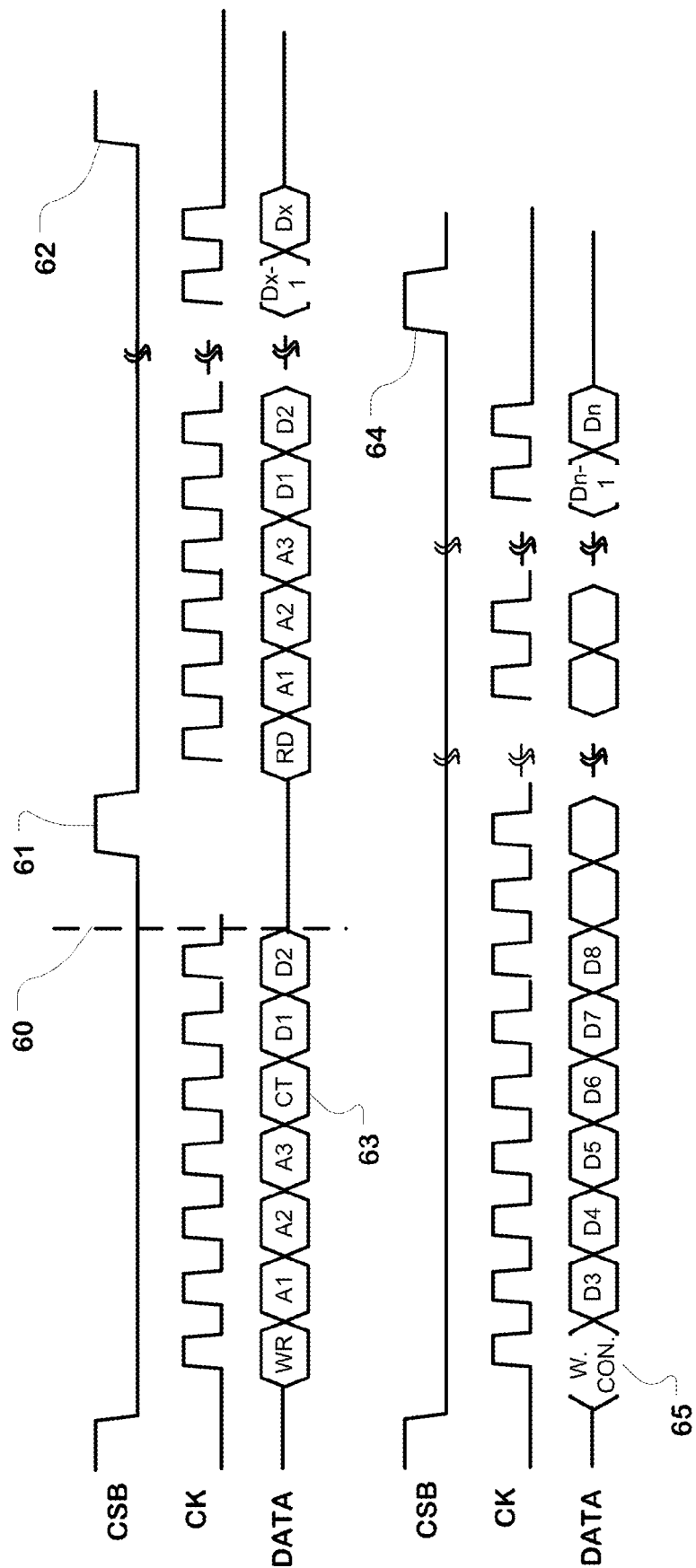
FIG. 11 is a timing diagram showing an interruptible write command sequence including a write count code and a write continue command.

FIG. 11 is an alternative interruptible write command sequence in which a write continue operation code is utilized, without a write confirm command.

In the example of FIG. 11, the first command sequence is initiated by the transition of the CSB line from high-to-low and by the beginning of the clock cycles on the CK line. The first byte of the first command sequence (eight bits received during the initial clock pulse) comprises an operation code WR for an interruptible write sequence. In some examples, the operation code WR may identify a page write operation. In the illustrated example, the next three bytes comprise a starting address for the write operation. After the starting address, the command sequence includes a write count code CT 63 which identifies the number of bytes to be included in the command sequence. After the address and write count, data for the write operation is provided. After the second data byte D2 at time 60, the controller interrupts the first command sequence. In this example, the command sequence is interrupted by a first control signal 61 which is the toggling the CSB line from low-to-high without a corresponding indication of the end of the write sequence. Upon interruption of the first command sequence, the command logic buffers the information received in the first command sequence for later resumption. Also, the controller again toggles the CSB line from high-to-low (a second control signal) and provides a second command sequence. The first byte of the second command sequence in this example is an operation code for a read RD. The three bytes following the first byte comprise a starting address for the read. After receipt of the starting address, command logic on the memory enables the embedded read operation, and in the clock cycles following the address, output data is provided from the memory to the controller. Upon completion of the read operation, the controller toggles the CSB line from low-to-high at time 62. At a later time, the controller causes the CSB line to transition from high-to-low to initiate a third command sequence.

The third command sequence comprises a resumption of the interrupted write command sequence. In this example, the first byte 65 of the third command sequence is the write continue operation code W.CON. for resumption of the interruptible write sequence. Also in this example, the command logic on the memory device stores the bytes received in the first command sequence for use upon resumption of the command sequence. Thus, the bytes in the third command sequence that follow the operation code comprise the data to be written. In this example, the first command sequence was interrupted after the second data byte D2, and the first byte following the operation code in the third command sequence is the third data byte D3 for the interruptible write sequence.

After the last data byte is provided (or if the sequence is to be interrupted again), the controller toggles the CSB line from low-to-high at time 64. At this time, the command logic determines whether the number of bytes received in the combination of the first and third command sequences matches the write count operation code. If the command logic finds that the entire sequence has been received, then the command logic enables control circuitry on the memory to execute the page write operation using embedded logic. Else, command logic returns to a standby mode while storing parts of the command sequence already received for use on possible resumption of the write command sequence.

Figure 12:
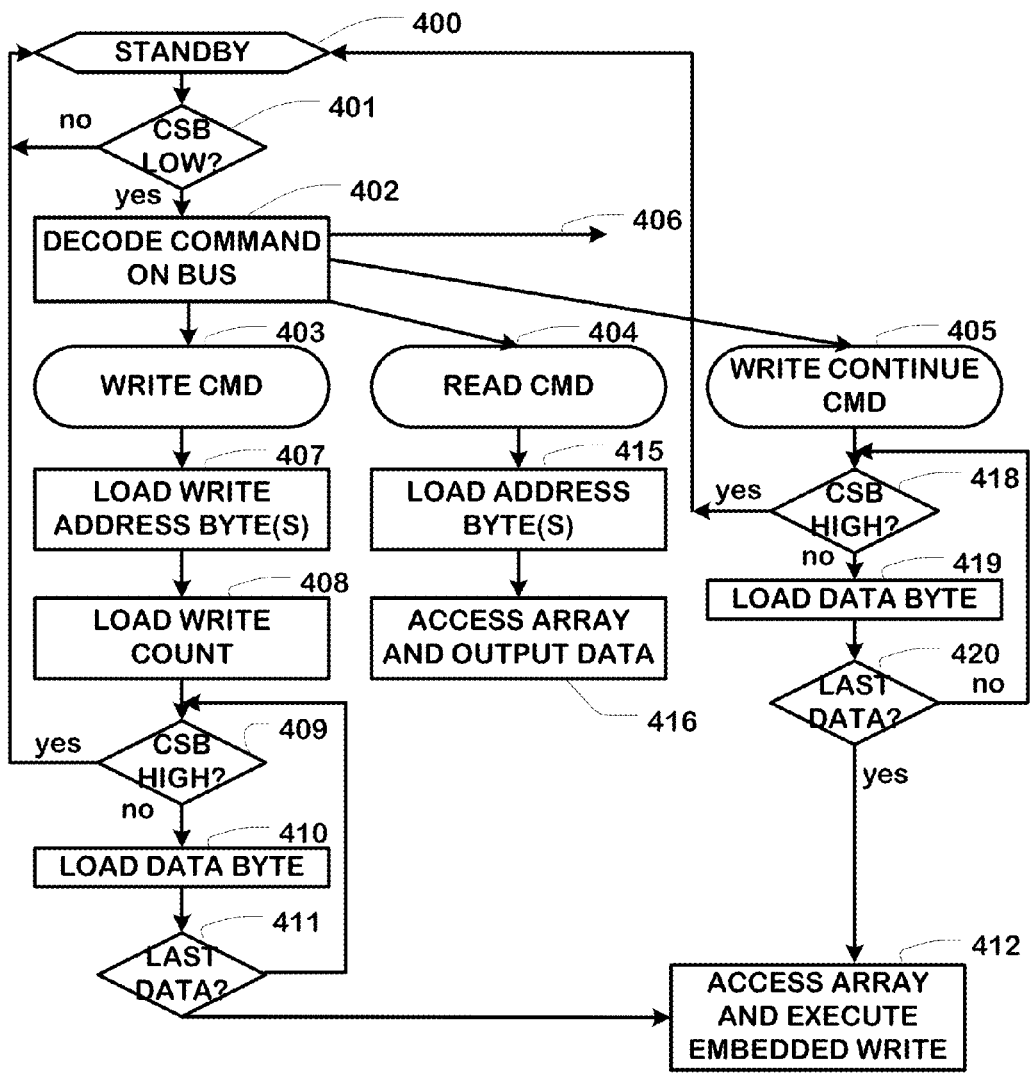
FIG. 12 is a logic diagram of command logic on a memory device for responding to an interruptible write command sequence as shown in FIG. 11.

FIG. 12 is a flow diagram for command logic on a memory device receiving the first, second and third command sequences described with reference to FIG. 11. In this example, the flow diagram begins with the command logic in a standby mode 400. In standby, the command logic monitors the CSB line to detect a transition from high-to-low (401). When the transition occurs, the command logic decodes an operation code identifying a command received on the bus (402). A variety of operation codes can be decoded including a write command 403, a read command 404, a write continue command 405, and other commands indicated by the arrow 406.

If the command logic decodes a write command, then it proceeds to load the address bytes from the command sequence, or read the address bytes from another source (407). Then the command logic loads or reads a write count (408). After receiving the address bytes and the write count, the command logic monitors the CSB line to detect a transition from low-to-high (409). If a transition is not detected, then the command logic loads a data byte from the command sequence (410). After step 410, the command logic determines whether the last data byte is received, (411) by comparing the number of received bytes with the write count. If the last data byte has not been received, then the command logic returns the block 409 to determine whether the CSB line transitions from low-to-high. This loop continues until all the data bytes are received, or until a transition is detected.

If the transition is detected at block 409, then the logic returns to the standby mode 400 while storing portions of the command sequence received before the interruption. In the standby mode 400, the command logic monitors the CSB line for a transition from high-to-low. If at block 411, it is determined that the last data byte has been received, then the command logic verifies that the complete command sequence is ready, enables the control circuitry to access the array and execute the embedded write operation (412). In some embodiments, after block 411, the command logic determines whether the CSB line has transitioned from low-to-high (not shown), and upon this transition verifies that the complete command sequence is ready, and enables the control circuitry to access the array and execute the embedded write operation (412).

If the command is a read command 404, then the command logic loads or reads the address bytes associated with the read (415), and enables the embedded circuitry to access the array and output the data of the read (416). Upon completion of the read operation, the memory can issue a ready signal, or the controller can detect the end and return to the standby mode 400.

If the command is a write continue command (405), then the command logic monitors the CSB line to detect a transition from low-to-high (418), and if no transition is detected loads a data byte from the command sequence (419). After step 419, the command logic determines whether the last data byte is received (420), by comparing the number of received bytes with the write count. If the last data byte has not been received, then the command logic returns to block 418 to determine whether the CSB line transitions from low-to-high. This loop continues until all the data bytes are received, or until a transition is detected.

If the transition is detected at block 418, then the logic returns to the standby mode 400 while storing portions of the command sequence received before the interruption. In the standby mode 400, the command logic monitors the CSB line for a transition from high-to-low.

If at block 420, it is determined that the last data byte has been received, then the command logic verifies that the complete command sequence is ready, and enables the control circuitry to access the array and execute the embedded write operation (412). In some embodiments, after block 420, if it is determined that the last data byte has been received, the command logic determines whether the CSB line transitions from low-to-high (not shown), and upon this transition verifies that the complete command sequence is ready, and enables the control circuitry to access the array and execute the embedded write operation (412).

Figure 13:
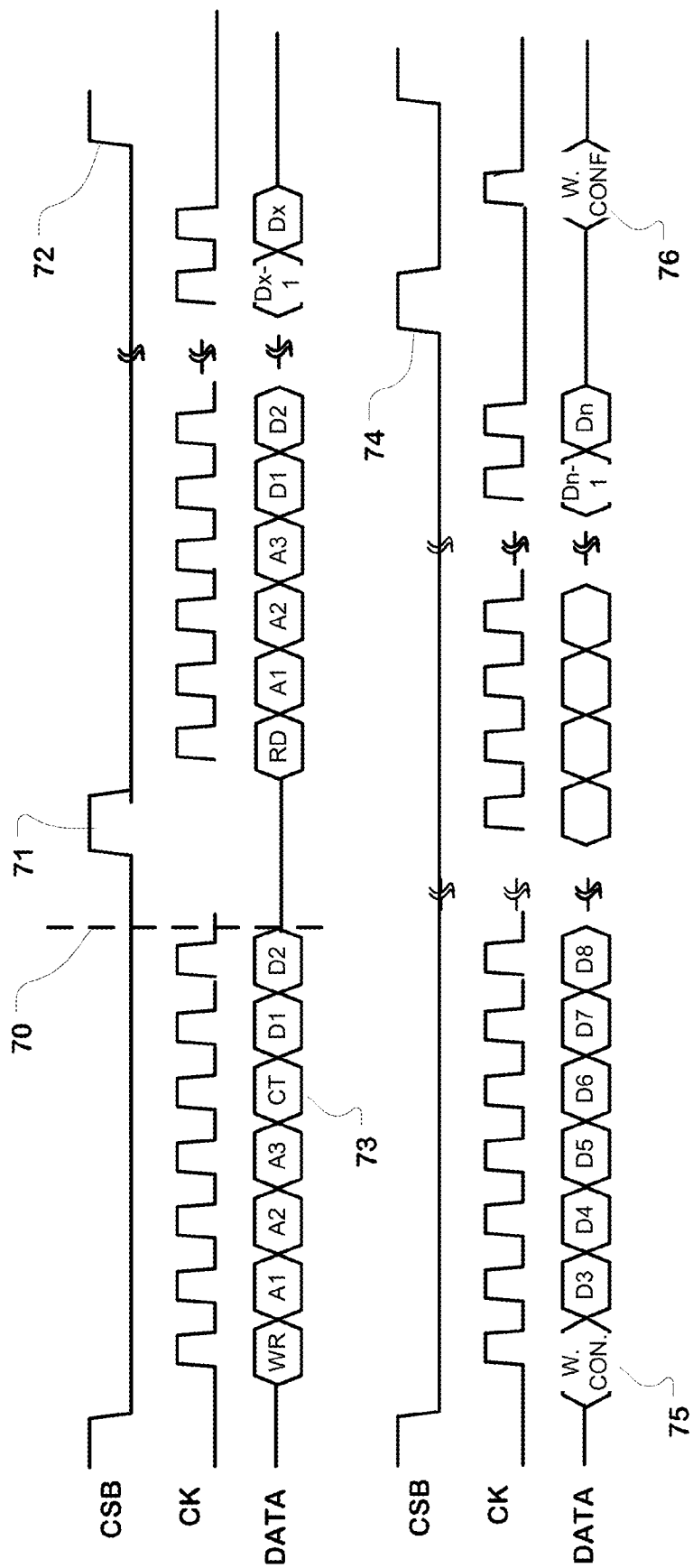
FIG. 13 is a timing diagram showing an interruptible write command sequence with a write continue command sequence and a write confirm command.

FIG. 13 is an alternative interruptible write command sequence with a write count, and in which a write continue operation code is utilized, with a write confirm command.

In the example of FIG. 13, the first command sequence is initiated by the transition of the CSB line from high-to-low and by the beginning of the clock cycles on the CK line. The first byte of the first command sequence (eight bits received during the initial clock pulse) comprises an operation code WR for an interruptible write sequence. In some examples, the operation code WR may identify a page write operation. In the illustrated example, the next three bytes comprise a starting address for the write operation. After the starting address, the command sequence includes a write count code 73 which identifies the number of data bytes to be included in the command sequence. After the address and write count, data for the write operation is provided. After the second data byte D2 at time 70, the controller interrupts the first command sequence. In this example, the command sequence is interrupted by a first control signal 71 which is toggling the CSB line from low-to-high without a corresponding indication of the end of the write sequence. Upon interruption of the first command sequence, the command logic buffers the information received in the first command sequence for later resumption. Also, the controller again toggles the CSB line from high-to-low (a second control signal) and provides a second command sequence. The first byte of the second command sequence in this example is an operation code for a read RD. The three bytes following the first byte comprise a starting address for the read. After receipt of the starting address, command logic on the memory enables the embedded read operation, and in the clock cycles following the address, output data is provided from the memory to the controller. Upon completion of the read operation, the controller toggles the CSB line from low-to-high at time 72. At a later time, the controller causes the CSB line to transition from high-to-low to initiate a third command sequence.

The third command sequence comprises a resumption of the interrupted write command sequence. In this example, the first byte 75 of the third command sequence is the write continue operation code W.CON. for resumption of the interruptible write sequence. Also in this example, the command logic on the memory device stores the bytes received in the first command sequence for use upon resumption of the command sequence. Thus, the bytes in the third command sequence that follow the operation code comprise the data to be written. In this example, the first command sequence was interrupted after the second data byte D2, and the first byte following the operation code in the third command sequence is the third data byte D3 for the interruptible write sequence.

After the last data byte Dn is provided, the controller toggles the CSB line from low-to-high at time 74. At this time, the command logic can determine and store a flag that indicates whether the number of bytes received in the combination of the first and third command sequences matches the write count operation code. However, the embedded write operation is not enabled at this stage. In this example, the command logic requires a following write confirm command 76. Upon receipt of a write confirm command following completion of a write command sequence or a write continue command sequence, with a correct number of data bytes, then the command logic enables control circuitry on the memory to execute the page write operation using embedded logic. Else, command logic returns to a standby mode.

Figure 14:
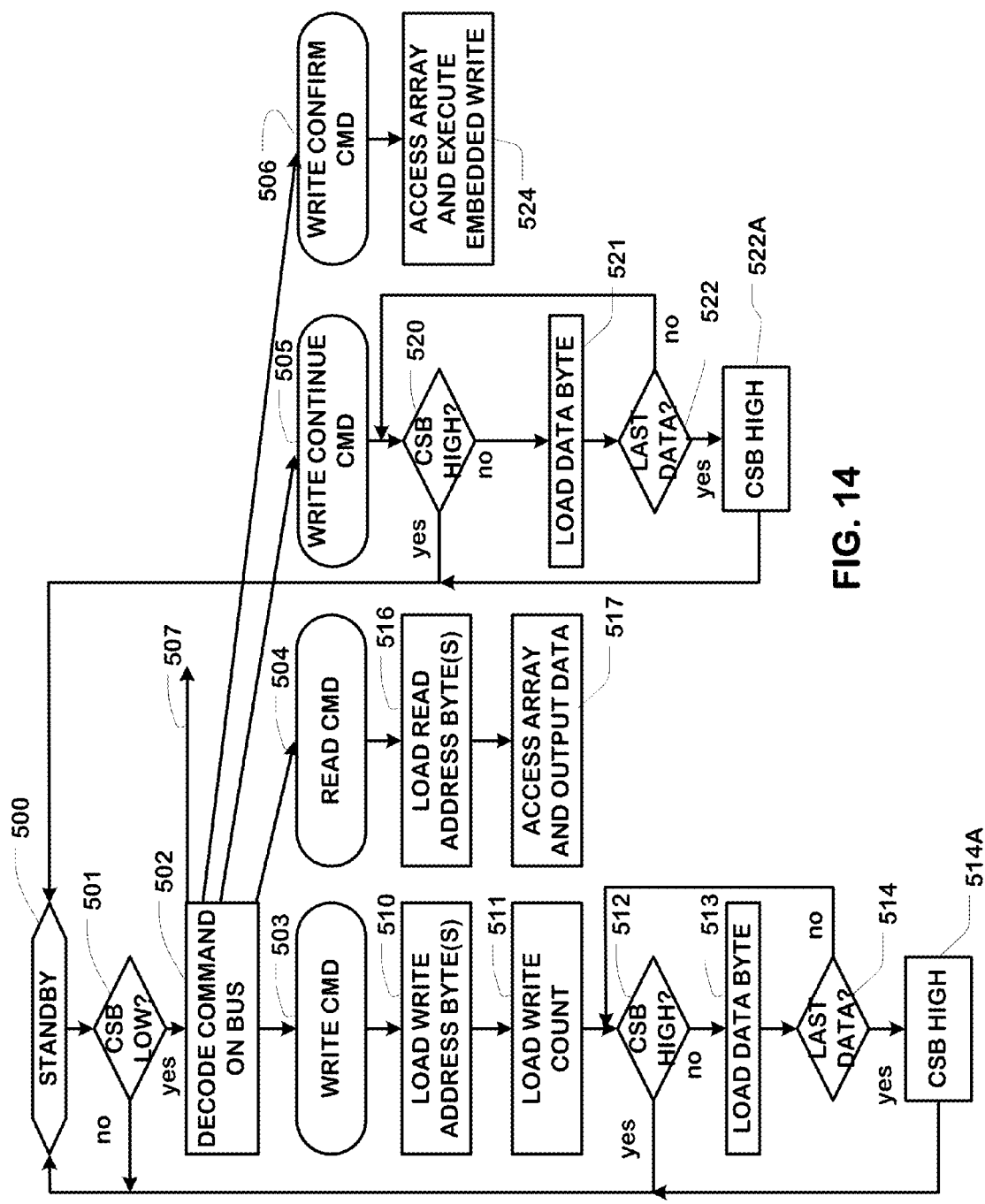
FIG. 14 is a logic diagram of command logic on a memory device for responding to an interruptible write command sequence as shown in FIG. 13.

FIG. 14 is a flow diagram for command logic on a memory device receiving the first, second and third command sequences described with reference to FIG. 13. In this example, the flow diagram begins with the command logic in a standby mode 500. In standby, the command logic monitors the CSB line to detect a transition from high-to-low (501). When the transition occurs, the command logic decodes an operation code identifying a command received on the bus (502). A variety of operation codes can be decoded including a write command 503, a read command 504, a write continue command 505, a write confirm command 506, and other commands indicated by the arrow 507.

If the command logic decodes a write command 503, then it proceeds to load the address bytes from the command sequence, or read the address bytes from another source (510). Then the command logic loads or reads a write count (511). After receiving the address bytes and the write count, the command logic monitors the CSB line to detect a transition from low-to-high (512). If a transition is not detected, then the command logic loads a data byte from the command sequence (513). After step 513, the command logic determines whether the last data byte is received (514), by comparing the number of received bytes with the write count. If the last data byte has not been received, then the command logic returns to block 512 to determine whether the CSB line transitions from low-to-high. This loop continues until all the data bytes are received, or until a transition is detected.

If the transition is detected at block 512, then the logic returns to standby mode 500 while storing portions of the command sequence received before the interruption. In standby mode 500, the command logic monitors the CSB line for a transition from high-to-low.

If at block 514, it is determined that the last data byte has been received, and CSB goes high 514A, then the command logic returns to standby mode 500 while storing a flag or other indication that all the data of the write command sequence has been received. Enabling of the embedded write occurs after receipt of a write confirm command as described below.

If the command is a read command 504, then the command logic loads or reads the address bytes associated with the read (516), and enables the embedded circuitry to access the array and output the data of the read (517). Upon completion of the read operation, the memory can issue a ready signal, or the controller can detect the end and return to the standby mode 500.

If the command is a write continue command (505), then the command logic monitors the CSB line to detect a transition from low-to-high (520), and if no transition is detected loads a data byte from the command sequence (521). After loading a data byte at block 521, the command logic determines whether the last data byte is received (522), by comparing the number of received bytes with the write count. If the last data byte has not been received, then the command logic returns to block 520 to determine whether the CSB line transitions from low-to-high. This loop continues until all the data bytes are received, or until a transition is detected.

If a transition is detected from low-to-high at block 520, then the command logic returns to standby mode 500, while storing portions of the command sequence received before the interruption in a buffer.

If at block 522, it is determined that the last data byte has been received, then after CSB goes high 522A, the command logic returns to standby mode 500 while storing a flag or other indication that all the data of the write command sequence has been received.

If the command is a write confirm command (506), then the command logic verifies that it has properly loaded a command sequence for a write, and enables the control circuitry on the memory to access the array and execute the embedded write operation (524). After enabling the embedded write operation, the controller can return to standby mode 500.

Figure 15:
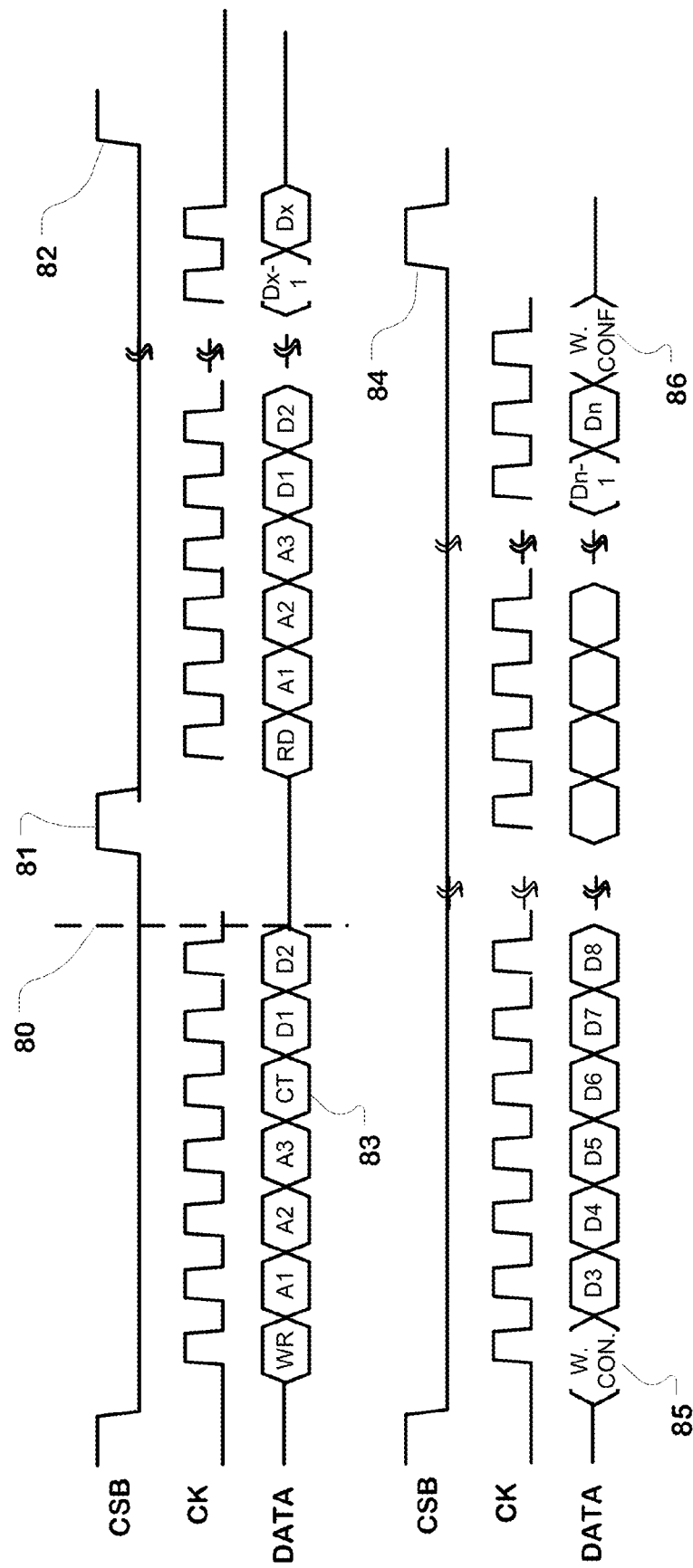
FIG. 15 is a timing diagram showing an interruptible write command sequence including a write count code, a write continue command sequence, and a write confirm code as part of the write continue command sequence.

FIG. 15 is an alternative interruptible write command sequence with a write count, in which a write continue operation code is utilized, with a write confirm code included in the command sequence.

In the example of FIG. 15, the first command sequence is initiated by the transition of the CSB line from high-to-low and by the beginning of the clock cycles on the CK line. The first byte of the first command sequence (eight bits received during the initial clock pulse) comprises an operation code WR for an interruptible write sequence. In some examples, the operation code WR may identify a page write operation.

In the illustrated example, the next three bytes comprise a starting address for the write operation. After the starting address, the command sequence includes a write count code 83 which identifies the number of bytes to be included in the command sequence. After the address and write count, data for the write operation is provided. After the second data byte D2 at time 80, the controller interrupts the first command sequence. In this example, the command sequence is interrupted by a first control signal 81 which is toggling the CSB line from low-to-high without a corresponding indication of the end of the write sequence. Upon interruption of the first command sequence, the command logic buffers the information received in the first command sequence for later resumption. Also, the controller again toggles the CSB line from high-to-low (a second control signal) and provides a second command sequence. The first byte of the second command sequence in this example is an operation code for a read RD. The three bytes following the first byte comprise a starting address for the read. After receipt of the starting address, command logic on the memory enables the embedded read operation, and in the clock cycles following the address, output data is provided from the memory to the controller. Upon completion of the read operation, the controller toggles the CSB line from low-to-high at time 82. At a later time, the controller causes the CSB line to transition from high-to-low to initiate a third command sequence.

The third command sequence comprises a resumption of the interrupted write command sequence. In this example, the first byte 85 of the third command sequence is the write continue operation code W.CON. for resumption of the interruptible write sequence. Also in this example, the command logic on the memory device stores the bytes received in the first command sequence for use upon resumption of the command sequence. Thus, the bytes in the third command sequence that follow the operation code comprise the data to be written. In this example, the first command sequence was interrupted after the second data byte D2, and the first byte following the operation code in the third command sequence is the third data byte D3 for the interruptible write sequence.

After the last data byte is provided, as can be determined using the write count, the sequence includes a write confirm code 86 which confirms the end of the write command sequence. Thereafter, the controller toggles the CSB line from low-to-high at time 84. At this time, the command logic determines whether the last byte in the write command sequence is the write confirm code. If the command logic finds that the entire sequence has been received with a write confirm code, then the command logic enables control circuitry on the memory to execute the page write operation using embedded logic. Else, command logic returns to a standby mode.

Figure 16:
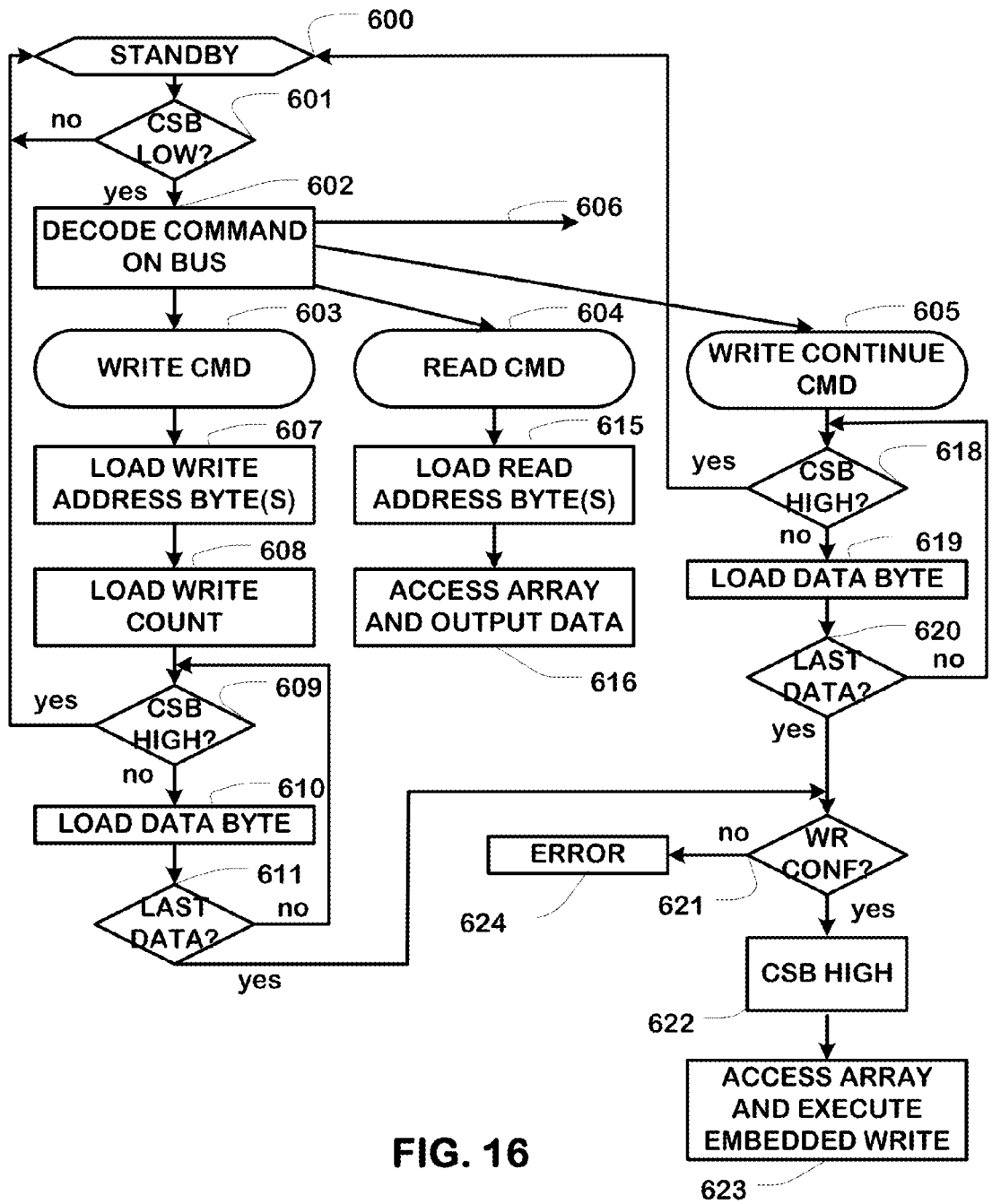
FIG. 16 is a logic diagram of command logic on a memory device for responding to an interruptible write command sequence as shown in FIG. 15.

FIG. 16 is a flow diagram for command logic on a memory device receiving the first, second, and third command sequences described with reference to FIG. 15. In this example, the flow diagram begins with the command logic in a standby mode 600. In standby, the command logic monitors the CSB line to detect a transition from high-to-low (601). When the transition occurs, the command logic decodes an operation code identifying a command received on the bus (602). A variety of operation codes can be decoded including a write command 603, a read command 604, a write continue command 605, and other commands indicated by the arrow 606.

If the command logic decodes a write command, then it proceeds to load the address bytes from the command sequence, or read the address bytes from another source (607). Then the command logic loads or reads a write count (608). After receiving the address bytes and the write count, the command logic monitors the CSB line to detect a transition from low-to-high (609). If a transition is not detected, then the command logic loads a data byte from the command sequence (610). After step 610, the command logic determines whether the last data byte is received (611) by comparing the number of received bytes with the write count. If the last data byte has not been received, then the command logic returns to block 609 to determine whether the CSB line transitions from low-to-high. This loop continues until all the data bytes are received, or until a transition is detected.

If the transition is detected at block 609, then the logic returns to standby mode 600 while storing portions of the command sequence received before the interruption. In standby mode 600, the command logic monitors the CSB line for a transition from high-to-low.

If at block 611, it is determined that the last data byte has been received, then the command logic determines whether the next byte is a write confirm code (621). If a write confirm code is received at block 621, then the command logic monitors for a transition in the CSB line at block 622. If a transition from low-to-high occurs at block 622, then the command logic verifies that the complete command sequence is ready, and enables the control circuitry to access the array and execute the embedded write operation (623). In some embodiments, after block 621, the command logic proceeds without monitoring for a transition in the CSB line, verifies that the complete command sequence is ready, and enables the control circuitry to access the array and execute the embedded write operation (623). If a write confirm command is not detected at block 621, then the command logic determines that an error condition has occurred (624), and can import the write operation, or perform other recovery operations.

If the command is a read command 604, then the command logic loads or reads the address bytes associated with the read (615), and enables the embedded circuitry to access the array and output the data of the read (616). Upon completion of the read operation, the memory can issue a ready signal, or the controller can detect the end and return to standby mode 600.

If the command is a write continue command (605), then the command logic monitors the CSB line to detect a transition from low-to-high (618), and if no transition is detected loads a data byte from the command sequence (619). After step 619, the command logic determines whether the last data byte is received (620), by comparing the number of received bytes with the write count. If the last data byte has not been received, then the command logic returns to block 618 to determine whether the CSB line transitions from low-to-high. This loop continues until all the data bytes are received, or until a transition is detected.

If the transition is detected at block 618, then the logic returns to standby mode 600 while storing portions of the command sequence received before the interruption. In standby mode 600, the command logic monitors the CSB line for a transition from high-to-low.

If at block 620, it is determined that the last data byte has been received, then the command logic determines whether the next byte is a write confirm code (621), and proceeds as discussed above.

Figure 17:
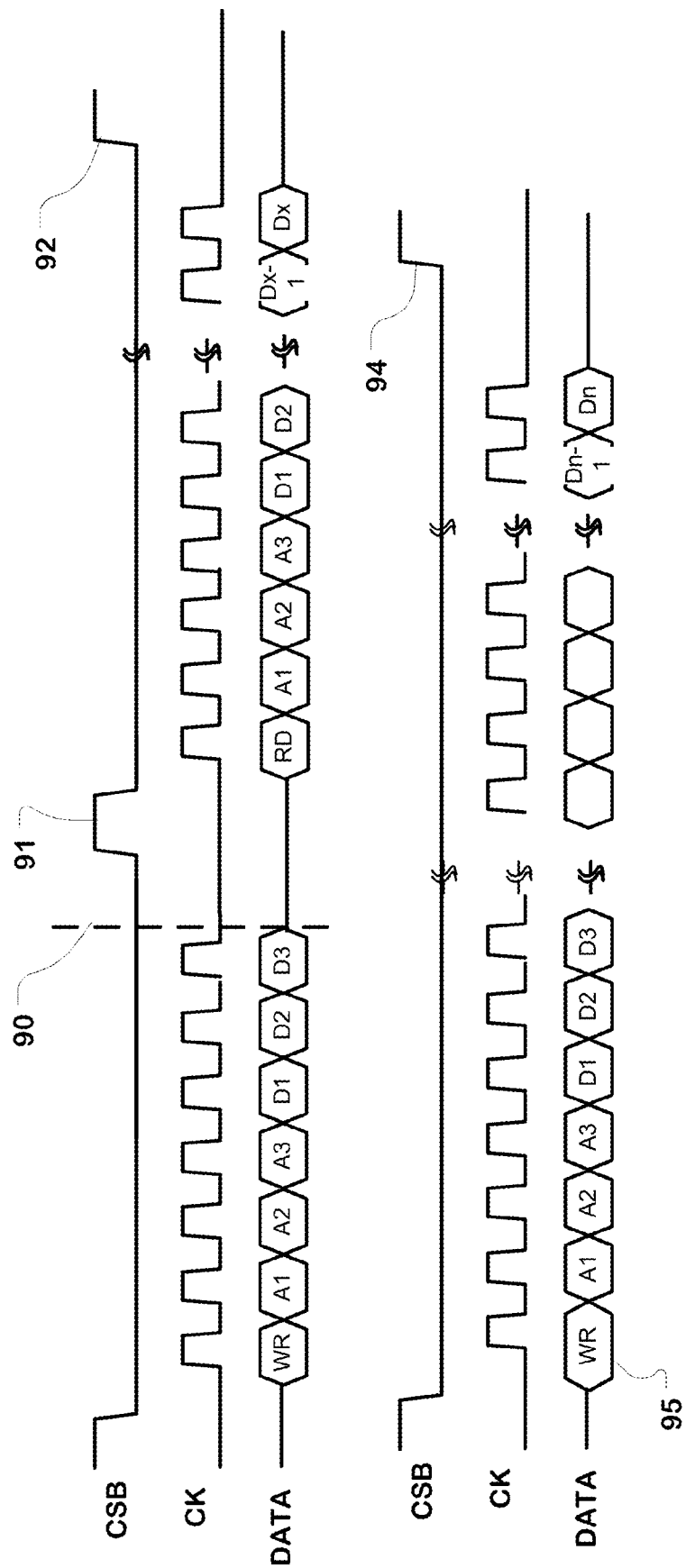
FIG. 17 is a timing diagram showing an interruptible write command sequence, in which an end of a write command sequence is indicated by an address boundary or write count provided by data outside the command sequence.

FIG. 17 is yet another alternative interruptible write command sequence in which completion of the write command sequence is indicated by detection of an address boundary.

In the example of FIG. 17, the first command sequence is initiated by transition of the CSB line from high-to-low and by the beginning of the clock cycles on the CK line. The first byte of the first command sequence comprises an operation code WR for an interruptible write sequence. In some examples, the operation code WR may identify a page write operation. In the illustrated example, the next three bytes comprise a starting address for the write operation. After the starting address, data for the write operation is provided. In this example, after the third data byte D3 at time 90, the controller interrupts the first command sequence. In this example, the command sequence is interrupted by a first control signal 91 which is the toggling of the CSB line from low-to-high without a corresponding indication of the end of the write sequence. Upon interruption of the first command sequence, the controller again toggles the CSB line from high-to-low and provides a second command sequence. The first byte of the second command sequence in this example is an operation code for a read RD. The three bytes following the first byte comprise a starting address for the read. After receipt of the starting address, command logic on the memory enables the embedded read operation, and in the clock cycles following the address, output data is provided from the memory to the controller. Upon completion of the read operation, the controller toggles the CSB line from low-to-high at time 92. At a later time the controller causes the CSB line to transition from high-to-low to initiate a third command sequence.

The third command sequence can therefore comprise a resumption of the interrupted write command sequence. In this example, the first byte 95 of the third command sequence is the operation code for an interruptible write WR, which can be the same operation code as used in the first command sequence. The three bytes that follow the operation code comprise the beginning address for the write operation. These address bytes may be the same as the interrupted write command sequence, or can be a different address if the interrupted write is not to be resumed. The bytes that follow the address comprise the data to be written. After a last data byte is provided, the command logic can determine whether the last data byte matches an address boundary, such as a page boundary in the memory being written. This can be detected by comparing the beginning address provided in the command sequence, with the preset address boundaries to be utilized. This can also be detected by determining a write count carried in the command sequences as in FIG. 15 or stored in a register or other source on the memory device, using a difference between the starting address in the command sequence and the present address boundaries.

After the last data byte is provided, the controller toggles the CSB line from low-to-high at time 94. At this time, the command logic determines whether the address boundary has been reached. If the command logic finds that the entire sequence has been received, then the command logic enables control circuitry on the memory to execute the write operation using embedded logic. Else, the command logic may return to a standby mode.

Figure 17A:
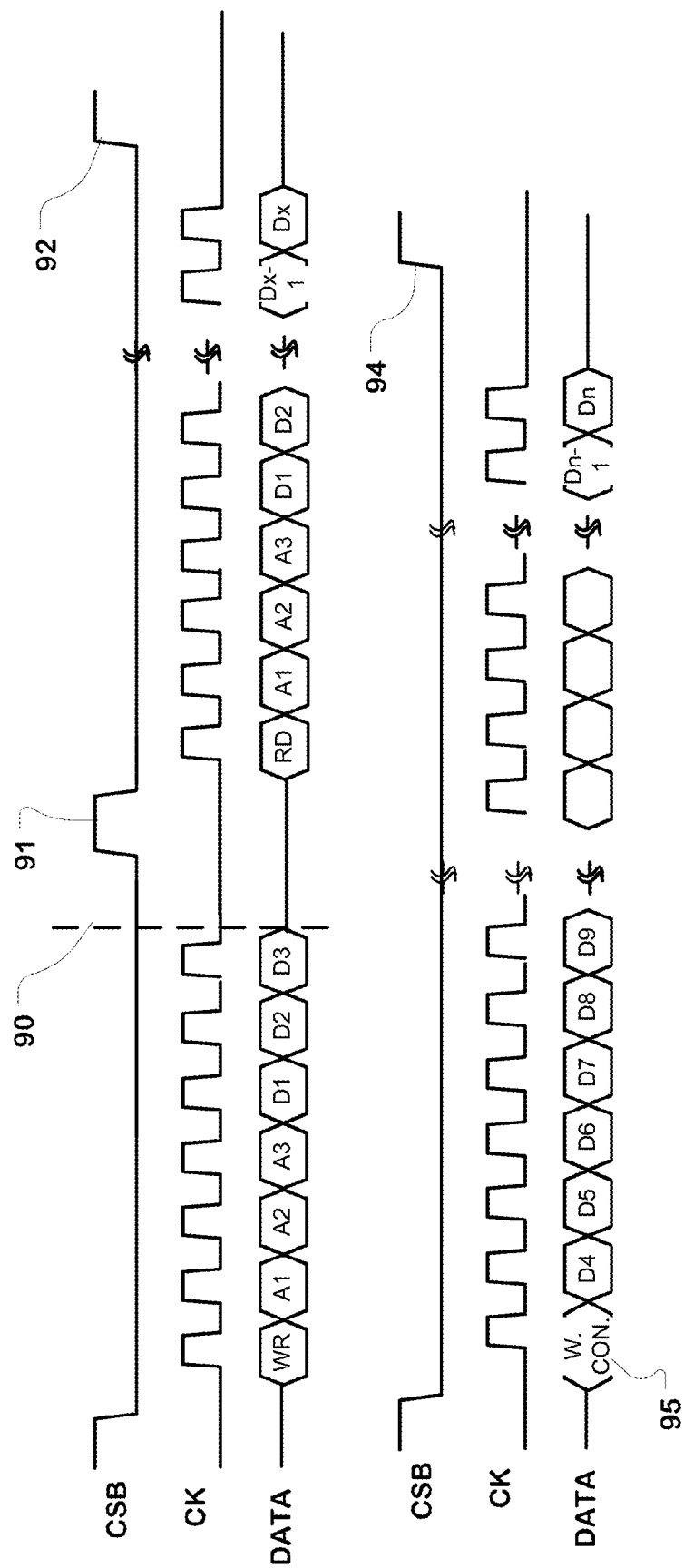
FIG. 17A is a timing diagram showing an alternative interruptible write command sequence, in which an end of a write command sequence is indicated by an address boundary or write count provided by data outside the command sequence.

FIG. 17A is an alternative like FIG. 17, in which the resumption of the command sequence with the a write continue command at cycle 95 as discussed above, can be followed by the data bytes without providing new address information. The data bytes can begin sequentially after the last successfully delivered data byte (D3) before the interruption of the interrupted write command sequence at point 90 in the timing diagram. The last data byte Dn in the resumed command sequence can be detected by reaching a preset address boundary which determines the number of data bytes in the write command sequence, as discussed with reference to FIG. 17, or using other write count logic.

Figure 18:
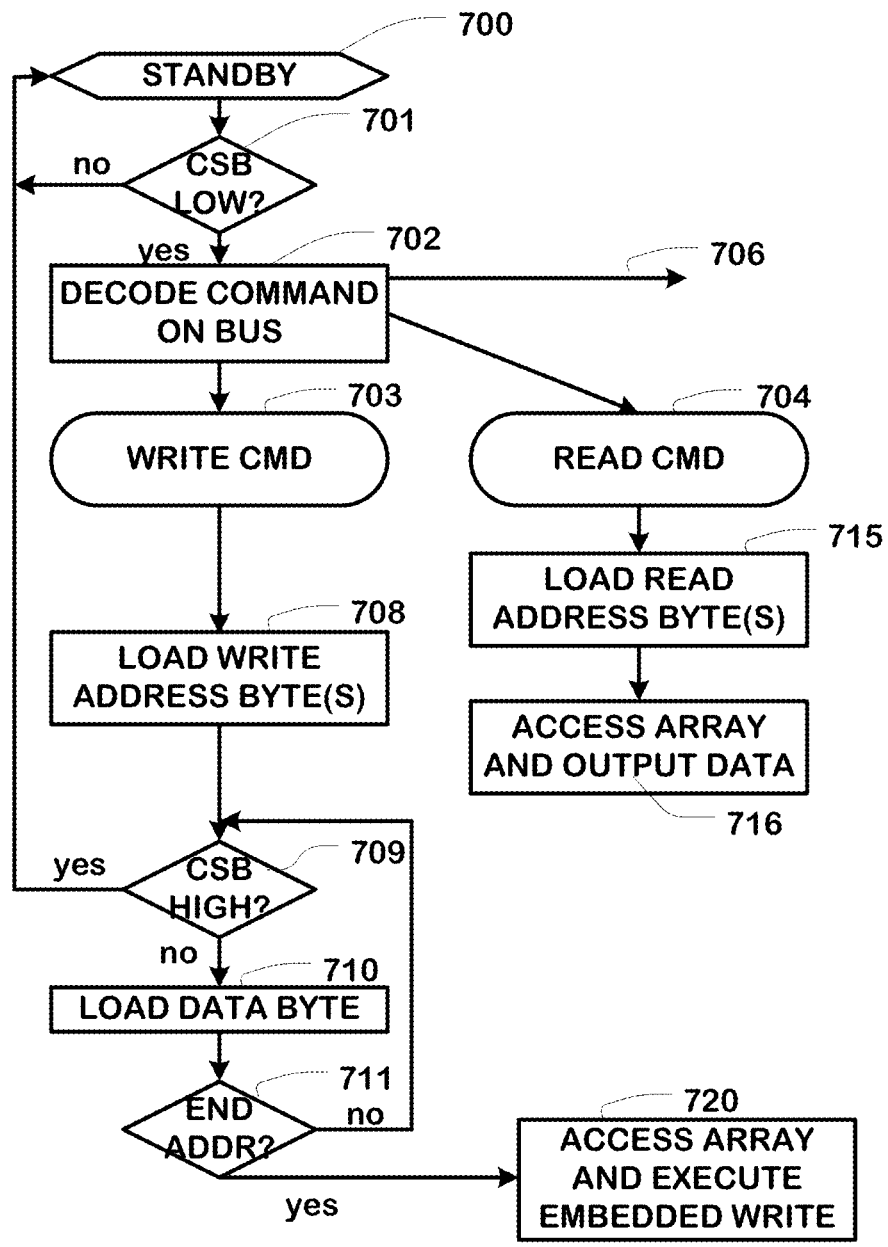
FIG. 18 is a logic diagram of command logic on a memory device for responding to an interruptible command sequence as shown in FIG. 17.

FIG. 18 is a flow diagram for command logic on a memory device receiving the first, second, and third command sequences described with reference to FIG. 17. In this example, the flow diagram begins with the command logic in a standby mode 700. In standby, the command logic monitors the CSB line to detect transition from high-to-low (701). When the transition occurs, the command logic decodes an operation code identifying a command on the bus (702). A variety of operation codes can be decoded including a write command 703, a read command 704, and other commands as indicated by the arrow 706.

If the command logic decodes the write command, then it proceeds to load or read address bytes for the starting address of the write (708). After receiving the address bytes, the command logic monitors the CSB line to detect transition from low-to-high (709). If a transition is not detected, then the command logic loads a data byte from the command sequence (710). Command logic then determines whether the data byte corresponds with the boundary address set for write operations (711). Command logic can perform this operation by comparing the start address received in the command sequence with an offset determined by the number of bytes of data received, with preset address boundaries.

If a boundary address is not detected, then the command logic returns to block 709 to monitor for transition in the CSB line. If at block 709, a transition is detected, then the command logic returns to standby mode 700.

If at block 711, is determined that a boundary address has been reached, then the command logic can enable control circuitry on the memory to access the array and execute the embedded write operation (720). In some embodiments, the command logic waits for a transition in the CSB line before enabling the embedded write operation.

If at block 702, the command decoded is a read command 704, then the command logic loads or reads the address bytes for the read from the command sequence (715). Then the command logic enables control circuitry on the memory to access the array and perform the embedded read operation (716).

Figure 18A:
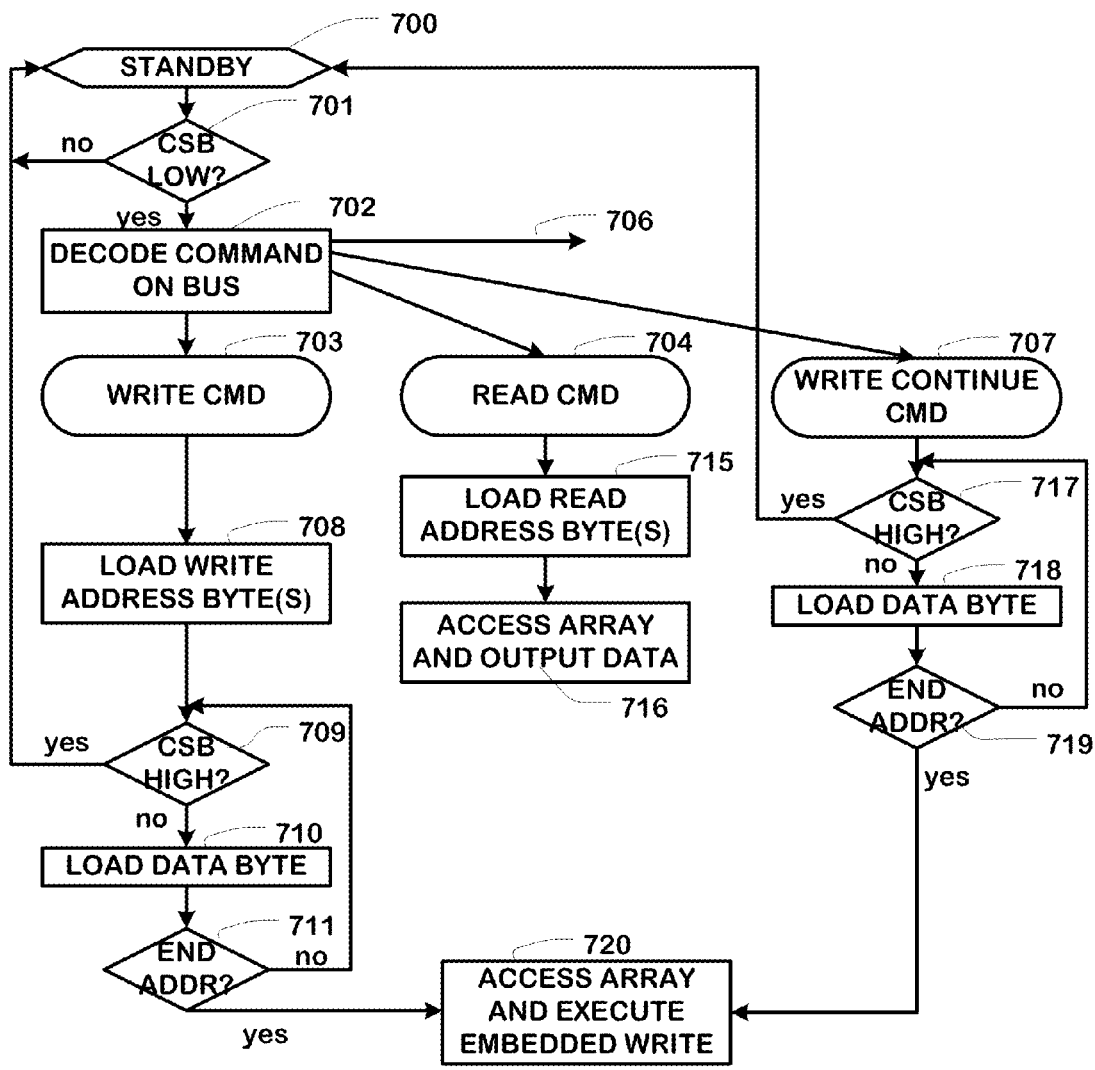
FIG. 18A is a logic diagram of command logic on a memory device for responding to an interruptible command sequence as shown in FIG. 17A.

FIG. 18A is a flow diagram corresponding to the sequence shown in FIG. 17A. The diagram is like FIG. 18, with the addition of logic for the write continue command. Only the added material relative to FIG. 18 is described again here. As stated with reference to FIG. 17A, the decoder can receive a write continue command at cycle 95. If the command is a write continue command (707), then the command logic monitors the CSB line to detect a transition from low-to-high (717), and if no transition is detected loads a data byte from the command sequence (718).

Command logic then determines whether the data byte corresponds with the boundary address set for write operations (719). Command logic can perform this operation by comparing the start address received in the command sequence with an offset determined by the number of bytes of data received, with preset address boundaries.

If a boundary address is not detected, then the command logic returns to block 717 to monitor for transition in the CSB line. If at block 717, a transition is detected, then the command logic returns to standby mode 700.

If at block 719, is determined that a boundary address has been reached, then the command logic can enable control circuitry on the memory to access the array and execute the embedded write operation (720). In some embodiments, the command logic waits for a transition in the CSB line before enabling the embedded write operation.

If a transition is detected from low-to-high at block 717, then the command logic returns to the standby mode 700, while in some embodiments storing portions of the command sequence received before the interruption in a buffer.

Figure 19:
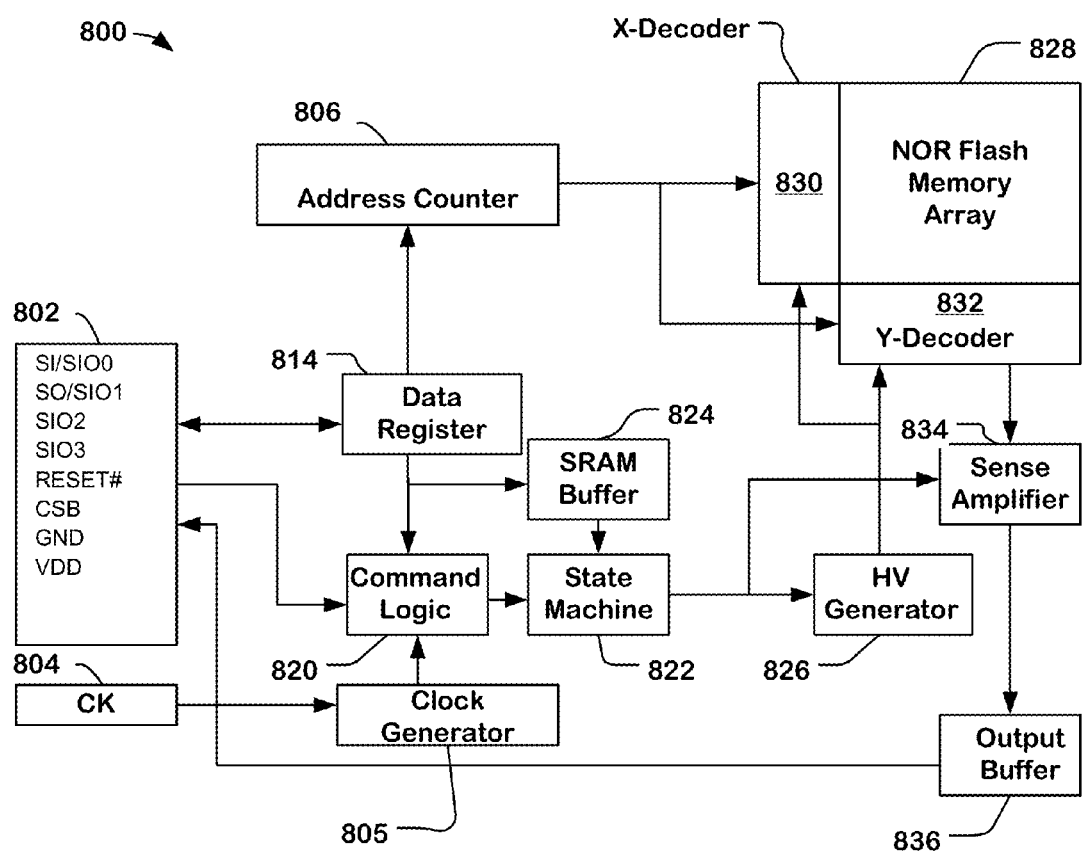
FIG. 19 is a simplified block diagram of a memory device including command logic and control circuitry supporting interruptible write command sequences as described herein.

FIG. 19 is a simplified block diagram of an integrated circuit 800, for example an SPI NOR flash memory device, including command logic and control circuits supporting interruptible write sequences as described herein. The integrated circuit 800 can be implemented on a single chip.

I/O block 802 shows a synchronous serial interface compliant with a serial peripheral interface SPI standard, and having standard pins. CS# is chip select, which can correspond to the CSB line discussed above. When CS# is brought low the device is selected. The RESET# signal allows the device to be reset, terminating the currently running process and resetting the state machine. GND and VDD are ground and power supply, respectively. In standard SPI, SI and SO are serial data input and output, respectively. In Dual SPI operation, SI and SO become bidirectional I/O pins: SIO0 and SIO1. In Quad SPI operation, SIO2 and SIO3 are available for higher-speed transfer. This is an example only; many pin configurations are possible. Serial clock SLCK 804 is also provided. A clock generator 805 on the integrated circuit generates clock signals for the command logic 820 and other elements of the integrated circuit. In this embodiment the clock generator 805 receives the SCLK from the SLCK 804 pin. The bus interface represented by I/O block 802 can support double data rate DDR or single data rate SDR protocols.

Other types of serial interfaces can be used in various embodiments. Memory technologies other than NOR flash memory may be used.

A control signal used to indicate the beginning and ending of a command sequence described herein may be signals on one or more of the bus lines in the block 802 in some examples. For example, in some embodiments, CS# or RESET# may be toggled, such as being pulled low-to-high in a first transition or high-to-low in a second transition. Alternatively, or in addition, a termination event may be generated internally by the chip control logic.

Address generator 806 includes circuits to provide address sequences for access to the memory array.

Data register 814 can act as an input buffer to store portions of command sequences in some embodiments. Data and parameters may be stored in SRAM buffer 824 in support of interruptible write operations, and other operations. In some examples, the data register 814 may be part of the SRAM buffer 824.

Integrated circuit 800 also includes command logic 820, which may generate internal control signals, and control circuitry such as a state machine 822 with supporting bias circuits. High-voltage generator 826 generates any higher voltages required, for example for read, program, and erase operations. The command logic 820 executes procedures such as those described with reference to FIGS. 8, 10, 12, 14, 16 and 18, and variations of such procedures to support interruptible write operations. The control circuitry including the state machine 822, in this example, executes embedded program, erase and read operations which access the memory array 828 when enabled by the command logic.

Memory array 828 includes X-decoder 830 and Y-decoder 832, and data signals are output via sense amplifier 834. Output buffer 836 may hold output data for output from the device.

In the example shown in FIG. 19, a command sequence comprises a sequence of bytes received on the SIO pins in the I/O block 802. The command logic 820 can include logic to decode the operation code, route the start address to the address counter, and provide control signals to set up and initiate embedded processes identified in the command sequences, including write (e.g. program and erase) and read processes using the state machine 822. The example shown in FIG. 19 is a serial flash device using a serial bus interface for sequential data access. The serial bus interface includes at least one synchronous clock signal CK, data signals, where the width of the storage unit carrying the data is greater than or equal to one bit, and at least one chip select signal CSB. Using a serial bus interface, the command sequences described above can be supported.

This configuration can be used to support buses compliant with the serial peripheral interface SPI standard bus architecture, where the port CS corresponds with the SPI active low chip select CSB, the port CK corresponds with the SPI serial clock SCLK; the port 0 corresponds with the SPI master-out/slave-in MOSI port, the port 1 corresponds with the SPI first master-in/slave-out MISO1 port; the port 2 corresponds with the SPI second master-in/slave-out MISO2 port; and the port 8 corresponds with the SPI third master-in/slave-out MISO3 port. The technology described herein can be used with other standard and non-standard bus architectures, including for example I2C.

Those skilled in the art will appreciate that this diagram is provided for example of one embodiment only; a device supporting interruptible write command sequences as described herein may vary widely from this diagram, comprising different elements, connected in different ways.

The embodiment shown in FIG. 19 includes a NOR flash memory array. Other types of memory systems can be utilized as well, including nonvolatile memory types including phase change memory PCM, resistive memory element memory known as ReRAM or RRAM, NAND flash memory, magnetoresistive memory, and so on. Also, other types of memory systems can be utilized that may include volatile memory such as DRAM.

Figure 20:
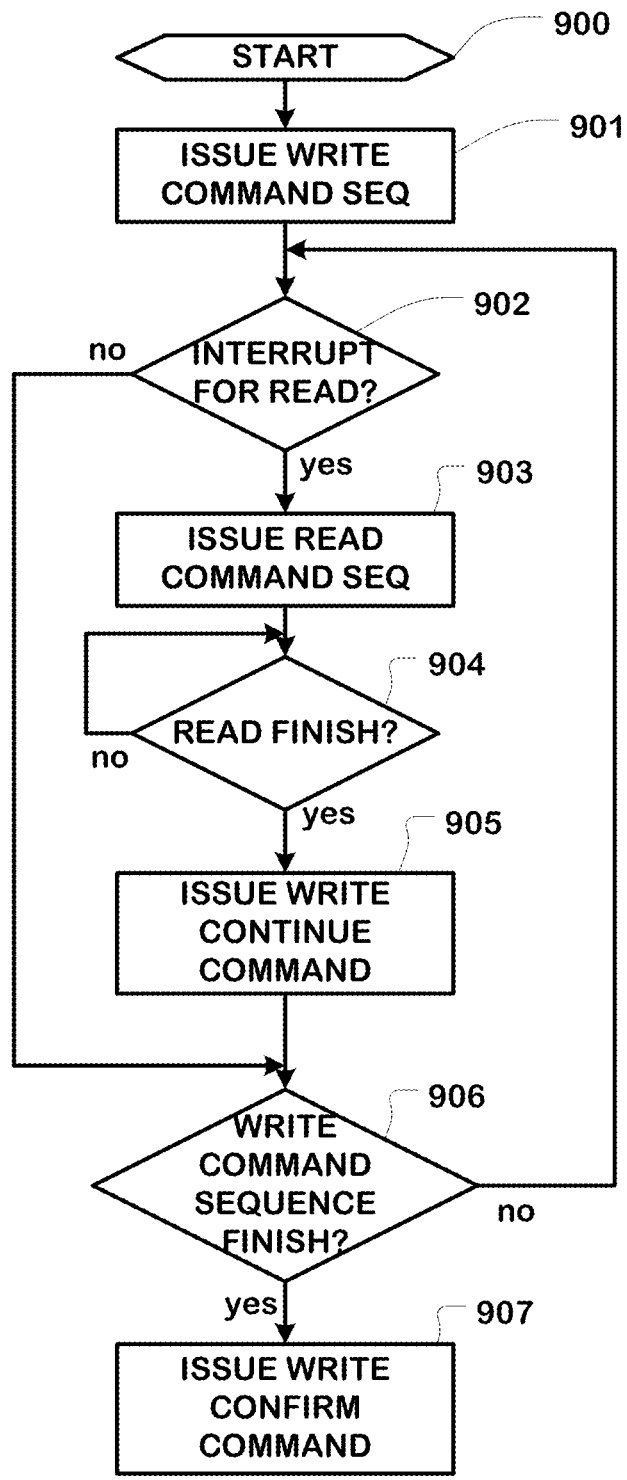
FIG. 20 is a simplified flowchart of a memory controller process for generating interruptible write command sequences as described herein.

FIG. 20 illustrates a logic flow in the controller used to generate a command sequence like that of FIG. 9. Of course modifications of this flow can be understood with reference to the command sequences illustrated in FIGS. 6, 7, 9A, 11, 13, 15, 17 and 17A. Of course variations on the controller logic can be implemented that support interruptible write command sequences in other protocols.

The logic flow begins when a controller starts a write function (900). The controller issues a write command sequence such as described above (901). The controller determines whether to interrupt the write command sequence for a read (902). If the controller determines to interrupt the command sequence, then it can issue a control signal, such as toggling the CSB line, and issue a read command sequence (903). The controller determines whether the read flow is completed (904). If it is not completed, then the controller waits. If it is completed, then the controller issues a write continue command to resume the interrupted write command sequence (905). The controller determines whether the command sequence is finished (906), and if so issues a write confirm command (907).

If at block 906, the controller determines that the command sequence is not finished, then it returns to block 902 to determine whether to interrupt the sequence for a read.

If at block 902, the controller does not interrupt the sequence for a read, then the flow jumps to block 906 to determine whether the command sequence is finished. When the command sequence is finished in this example, the controller issues a write confirm command (907). In other embodiments, the write confirm command may not be used, while other techniques are employed to allow the memory device to recognize the end of the write sequence, such as a write count, or logic on the memory device to detect an address boundary or other event that signals the end of the write sequence.

This logic flow demonstrates that a controller can interrupt an interruptible write command sequence any number of times specified higher priority operations, such as read operations.

According to this logic flow, and variations of the flow implemented to accommodate other interruptible write command sequence protocols, a memory controller or a logical process equivalent to a memory controller executed by any type of processor can issue a write command sequence that can include a large number of data bytes, such as can occur in a page write sequence. If a mission-critical read is requested, the controller can interrupt the long write sequence, and complete the read sequence and receive the read data without suffering latency associated with completing the interrupted write sequence. Upon completion of the read, the interrupted write command sequence can be resumed. Also, the logic flow demonstrates that a long write command sequence can be interrupted a plurality of times to support mission-critical read operations.

A serial type Flash Memory is described herein having a command protocol and supporting logic and memory that includes a page write command and write confirm command. The data of the page is issued sequentially after the page write Command.

A serial type Flash Memory is described herein having a command protocol and supporting logic and memory that includes a page write command, write continue command and write confirm command. The data is issued sequentially after one or a combination of these commands.

A serial type Flash Memory is described herein having a command protocol and supporting logic and memory that includes a page write command, write continue command and a write count parameter. The data is issued sequentially after one or a combination of these commands In protocols implementing various embodiments described herein the width (number of bus lines) of "CLK (Clock)", "CSB(Chip Select)", DATA" may be one or more (1-bit to n-bit). (Examples: CLK, CLK#, DATA0~DATAn, CSB1, CSB2)

In protocols implementing various embodiments described herein, the number of "Address" cycles may be one or more depending on the particular addressing scheme deployed. (Examples: 0 to n cycles), and the number of address bits can vary as well depending on the addressing schemes utilized.

In protocols implementing various embodiments described herein, the number of "command" cycles (Examples: "Write", "READ", "Write continue", "Write Confirm" and "Write Count") may be one or more, depending on the code lengths and numbers of bus lines.

In protocols implementing various embodiments described herein, the data unit referred to by the "Write Count" may be arbitrary (Examples: 1-bit/byte/word/page to n-bit/byte/word/page.)

In protocols implementing various embodiments described herein, the "Command", "Address", "DATA" lines can be operated using double data rate DDR and single data rate SDR receivers and transmitters (Data may be are valid on both the rising edge and the falling edge, or data may be valid on the rising edge or the falling edge.).

In protocols implementing various embodiments described herein, the Write sequence may or may not include a "Dummy Cycle"

The "Write Command, Write Address, Write Data, Write Count, Write Continue, Write Confirm, Write Abort" may be used on any practical combination, with appropriate decoding logic and resources on the device.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, state machines implemented in circuitry and by combinations of dedicated logic hardware and computer programs. With all flowcharts herein, it will be appreciated that many of the steps can be combined, performed in parallel, or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
a memory;
a bus interface;
control circuitry to access the memory and execute memory read and write operations;
command logic configured to decode command sequences received on the bus interface that comprise corresponding operation codes, and one or both of addresses and data, received on the bus interface, and to enable the control circuitry to execute operations identified in the command sequences;
while receiving a first command sequence, the command logic being responsive to a first control signal to interrupt the first command sequence;
the command logic being responsive to a second control signal after the first control signal, to receive and decode a second command sequence and to enable the control circuitry to execute an operation identified in the second command sequence;
the command logic responsive to a third control signal after completion of the second command sequence to receive and decode a third command sequence, the third command sequence including an operation code and data, to complete the interrupted first command sequence, and to enable the control circuitry to execute the operation identified in the first command sequence.

2. The memory device of claim 1, wherein the bus interface is configured for a synchronous serial bus.

3. The memory device of claim 1, the command logic including a buffer to hold at least portions of the first command sequence, and the command logic decodes the third command sequence using the portions of the first command sequence stored in the buffer.

4. The memory device of claim 1, wherein the operation code of the first command sequence identifies a write operation, and the operation code of the second command sequence identifies a read operation.

5. The memory device of claim 1, wherein the operation code of the first command sequence identifies a write operation for which data is received in the bus interface on a particular bus line, and the operation code of the second command sequence identifies a read operation for which the operation code is received in the bus interface on the same particular bus line.

6. The memory device of claim 1, wherein the operation code of the first command sequence identifies a write operation, and the third command sequence includes the operation code and the address of the first command sequence.

7. The memory device of claim 1, wherein the operation code of the first command sequence identifies a write operation, and the third command sequence includes a write continue operation code with an address.

8. The memory device of claim 1, wherein the operation code of the first command sequence identifies a write operation and a write count.

9. The memory device of claim 1, wherein the command logic is configured to enable embedded operations associated with the first command sequence, in response to a write confirm operation code received on the bus interface, received after the third command sequence.

10. A method for operating a memory device, having a memory including a bus interface and control circuitry to access the memory and execute memory read and write operations, and command logic configured to decode command sequences received on the bus interface that comprise corresponding operation codes, and one or both of addresses and data, received on the bus interface, and to enable the control circuitry to execute operations identified in the command sequences; the method comprising:
while receiving a first command sequence, interrupting the first command sequence in response to a first control signal;
in response to a second control signal after the first control signal, receiving and decoding a second command sequence and enabling the control circuitry to execute an operation identified in the second command sequence;
in response to a third control signal after completion of the second command sequence, receiving and decoding a third command sequence, the third command sequence including an operation code and data, to complete the interrupted first command sequence; and
enabling the control circuitry to execute the operation identified in the first command sequence after receiving the third command sequence.

11. The method of claim 10, wherein the bus interface is configured for a synchronous serial bus.

12. The method of claim 10, including storing at least portions of the first command sequence in a buffer, and decoding the third command sequence using the portions of the first command sequence stored in the buffer.

13. The method of claim 10, wherein the operation code of the first command sequence identifies a write operation, and the operation code of the second command sequence identifies a read operation.

14. The method of claim 10, wherein the operation code of the first command sequence identifies a write operation for which data is received in the bus interface on a particular bus line, and the operation code of the second command sequence identifies a read operation for which the operation code is received in the bus interface on the same particular bus line.

15. The method of claim 10, wherein the operation code of the first command sequence identifies a write operation, and the third command sequence includes the operation code and the address of the first command sequence.

16. The method of claim 10, wherein the operation code of the first command sequence identifies a write operation, and the third command sequence includes a write continue operation code with an address.

17. The method of claim 10, wherein the operation code of the first command sequence identifies a write operation and a write count, and the third command sequence includes a write continue operation code.

18. The method of claim 10, wherein the third command sequence includes a write confirm code in a last cycle in the sequence.

19. A memory device, comprising:
a nonvolatile memory;
a synchronous serial bus interface;
control circuitry to access the memory and execute memory read and write operations; and
command logic configured to decode command sequences received on the bus interface that comprise corresponding operation codes, and one or both of addresses and data, received on the bus interface, and to enable the control circuitry to execute operations identified in the command sequences;
while receiving a first command sequence including an operation code for a page write operation, the command logic being responsive to a first control signal to interrupt the first command sequence;
the command logic being responsive to a second control signal after the first control signal, to receive and decode a second command sequence including an operation code for another operation, and to enable the control circuitry to execute the other operation identified in the second command sequence;
the command logic responsive to a third control signal after the second command sequence, to receive and decode a third command sequence, the third command sequence including an operation code and data, to complete the interrupted first command sequence, and to enable the control circuitry to execute the page write operation identified in the first command sequence.

20. The memory device of claim 19, wherein the data for the page write of the first command sequence is received in the bus interface on a particular bus line, and the operation code of the second command sequence is received in the bus interface on the same particular bus line.

* * * * *